US012194995B2

(12) United States Patent
Li

(10) Patent No.: US 12,194,995 B2
(45) Date of Patent: Jan. 14, 2025

(54) DRIVING PROCESSING METHOD, VEHICLE, TERMINAL, SERVER, SYSTEM AND STORAGE MEDIUM

(71) Applicant: BOE Technology Group Co., Ltd., Beijing (CN)

(72) Inventor: Weiguo Li, Beijing (CN)

(73) Assignee: BOE Technology Group Co., Ltd., Beijing (CN)

(*) Notice: Subject to any disclaimer, the term of this patent is extended or adjusted under 35 U.S.C. 154(b) by 304 days.

(21) Appl. No.: 17/297,432

(22) PCT Filed: May 26, 2020

(86) PCT No.: PCT/CN2020/092360
§ 371 (c)(1),
(2) Date: May 26, 2021

(87) PCT Pub. No.: WO2020/238904
PCT Pub. Date: Dec. 3, 2020

(65) Prior Publication Data
US 2022/0009488 A1 Jan. 13, 2022

(30) Foreign Application Priority Data
May 31, 2019 (CN) .......................... 201910469292.6

(51) Int. Cl.
*B60W 30/16* (2020.01)
*B60W 10/18* (2012.01)
(Continued)

(52) U.S. Cl.
CPC ............ *B60W 30/16* (2013.01); *B60W 10/18* (2013.01); *B60W 30/18109* (2013.01);
(Continued)

(58) Field of Classification Search
CPC ........... B60W 10/18; B60W 2050/146; B60W 2420/42; B60W 2420/52; B60W 2510/18;
(Continued)

(56) References Cited

U.S. PATENT DOCUMENTS 9,965,957 B2 * 5/2018 Li ........................... G06T 11/60
10,740,641 B2 * 8/2020 Iguchi ....................... G06T 7/73
(Continued)

FOREIGN PATENT DOCUMENTS

CN 101983881 A 3/2011
CN 103594002 A 2/2014
(Continued)

OTHER PUBLICATIONS

International Search Report for PCT/CN/2020/092360 Mailed Jul. 29, 2020.
(Continued)

*Primary Examiner* — Babar Sarwar
(74) *Attorney, Agent, or Firm* — Ling Wu; Stephen Yang; Ling and Yang Intellectual Property

(57) ABSTRACT

Disclosed are a driving processing method, a vehicle (300), a mobile terminal (700), a server (400), a driving system and a computer-readable storage medium. The driving processing method comprises: receiving regional driving information, wherein the regional driving information comprises driving information of all vehicles within a preconfigured driving range (S120); and displaying a vehicle distribution map according to the regional driving information, wherein the vehicle distribution map comprises a positional relationship between all the vehicles within the preconfigured driving range (S130).

19 Claims, 14 Drawing Sheets

(51) Int. Cl.
*B60W 30/18* (2012.01)
*B60W 40/04* (2006.01)
*B60W 40/06* (2012.01)
*B60W 50/14* (2020.01)

(52) U.S. Cl.
CPC ............ *B60W 40/04* (2013.01); *B60W 40/06* (2013.01); *B60W 50/14* (2013.01); *B60W 2050/146* (2013.01); *B60W 2420/403* (2013.01); *B60W 2420/408* (2024.01); *B60W 2510/18* (2013.01); *B60W 2710/18* (2013.01); *B60W 2756/10* (2020.02)

(58) Field of Classification Search
CPC ......... B60W 2520/10; B60W 2552/40; B60W 2554/406; B60W 2554/801; B60W 2554/802; B60W 2555/20; B60W 2556/40; B60W 2556/45; B60W 2710/18; B60W 2756/10; B60W 30/16; B60W 30/18109; B60W 40/04; B60W 40/06; B60W 50/14
See application file for complete search history.

(56) References Cited

U.S. PATENT DOCUMENTS

| | | | | |
|---|---|---|---|---|
| 10,816,983 | B2* | 10/2020 | Cullinane | B60W 60/0016 |
| 10,955,259 | B2* | 3/2021 | Shinkar | G01C 21/3691 |
| 11,270,583 | B2* | 3/2022 | Kumar | G05B 15/02 |
| 11,402,513 | B2* | 8/2022 | Newman | G06K 7/1095 |
| 11,441,916 | B1* | 9/2022 | Konrardy | G01C 21/3617 |
| 11,451,949 | B2* | 9/2022 | Newman | H04W 8/005 |
| 11,574,263 | B2* | 2/2023 | Shoval | G01C 21/3492 |
| 11,590,968 | B2* | 2/2023 | Heinecke | B60W 30/09 |
| 11,620,592 | B2* | 4/2023 | Ramot | G06Q 10/06 701/410 |
| 2007/0078601 | A1* | 4/2007 | Nakano | G01S 19/51 340/436 |
| 2012/0130561 | A1* | 5/2012 | Chiang | G08G 1/165 701/1 |
| 2013/0282277 | A1* | 10/2013 | Rubin | G08G 1/09 701/517 |
| 2014/0067250 | A1* | 3/2014 | Bone | G08G 1/167 701/301 |
| 2014/0119597 | A1* | 5/2014 | Sung | G06V 20/58 382/103 |
| 2014/0257659 | A1* | 9/2014 | Dariush | G08G 1/166 701/1 |
| 2014/0285364 | A1* | 9/2014 | Chen | G08G 1/167 340/988 |
| 2016/0093215 | A1* | 3/2016 | Kiefer | G08G 1/166 340/438 |
| 2017/0127249 | A1 | 5/2017 | Li et al. | |
| 2017/0330463 | A1* | 11/2017 | Li | B60K 35/50 |
| 2018/0149491 | A1 | 5/2018 | Tayama et al. | |
| 2019/0176824 | A1* | 6/2019 | Patel | B60W 50/14 |
| 2020/0062249 | A1* | 2/2020 | Light | G08G 1/017 |

FOREIGN PATENT DOCUMENTS

| | | | | |
|---|---|---|---|---|
| CN | 103794085 | A | | 5/2014 |
| CN | 105898676 | A | | 8/2016 |
| CN | 106097775 | A | | 11/2016 |
| CN | 106487904 | A | | 3/2017 |
| CN | 106530690 | A | | 3/2017 |
| CN | 108022452 | A | * | 5/2018 |
| CN | 108074409 | A | | 5/2018 |
| CN | 108091154 | A | | 5/2018 |
| CN | 108091177 | A | | 5/2018 |
| CN | 110197587 | A | | 9/2019 |
| JP | 2009-223845 | A | | 10/2009 |
| JP | 2016-218732 | A | | 12/2016 |
| JP | 6113375 | B2 | | 4/2017 |
| KR | 20160089580 | A | * | 1/2024 |
| WO | 2016186039 | A1 | | 11/2016 |

OTHER PUBLICATIONS

Office Action dated May 6, 2020 for Chinese Patent Application No. 201910469292.6 and English Translation.
Office Action dated Feb. 1, 2021 for Chinese Patent Application No. 201910469292.6 and English Translation.
Office Action dated Jun. 2, 2021 for Chinese Patent Application No. 201910469292.6 and English Translation.
Decision of Rejection dated Oct. 15, 2021 for Chinese Patent Application No. 201910469292.6 and English Translation.

* cited by examiner

DRIVING PROCESSING METHOD, VEHICLE, TERMINAL, SERVER, SYSTEM AND STORAGE MEDIUM

CROSS-REFERENCE TO RELATED APPLICATIONS

The present application is a U.S. National Phase Entry of International Application No. PCT/CN2020/092360 having an international filing date of May 26, 2020, which claims the priority to the Chinese Patent Application No. 201910469292.6, filed to the CNIPA on May 31, 2019 and entitled "Driving Processing Method, Vehicle, Terminal, Server, System and Storage Medium". The entire contents of the above-identified applications are hereby incorporated by reference.

TECHNICAL FIELD

Embodiments of the present disclosure relate to, but are not limited to, the technical field of communication, in particular to a vehicle movement processing method, a vehicle, a mobile terminal, a server, a vehicle movement system, and a computer readable storage medium.

BACKGROUND

In a scenario of vehicle movement, especially when a preceding vehicle is a large truck, or a container truck, and sheltering is relatively severe, a following vehicle may be unable to know a road condition and a vehicle condition in front of the preceding vehicle in time, which affects safety of vehicle movement.

SUMMARY

Following is a summary of subject matter described in detail herein. This summary is not intended to limit the protection scope of the claims.

In a first aspect, an embodiment of the present disclosure provides a vehicle movement processing method, including: receiving regional vehicle movement information, wherein the regional vehicle movement information includes vehicle movement information of all vehicles within a preset vehicle movement range; and, displaying a map of vehicle distribution according to the regional vehicle movement information, wherein the map of vehicle distribution includes a positional relationship of all vehicles within the preset vehicle movement range.

In an exemplary embodiment, the vehicle movement processing method further includes: sending vehicle movement information of a present vehicle.

In an exemplary embodiment, the vehicle movement information of the present vehicle includes inherent information and information of vehicle movement mode, wherein the inherent information includes at least one of: an identification code of vehicle or a license plate number, and the information of vehicle movement mode includes positioning information.

In an exemplary embodiment, the vehicle movement information further includes one or more of: vehicle movement lane information, speed information, steering information, speed change information, or braking information.

In an exemplary embodiment, the map of vehicle distribution further includes lanes and/or state information of the vehicles.

In an exemplary embodiment, displaying the map of vehicle distribution according to the regional vehicle movement information includes: generating and displaying the map of vehicle distribution in which the present vehicle is identified according to the regional vehicle movement information, wherein positions of the vehicles in the map of vehicle distribution are determined according to the positioning information in the regional vehicle movement information.

In an exemplary embodiment, the vehicle movement processing method further includes: monitoring a distance between the present vehicle and an adjacent vehicle in real time, and performing a position adjustment in the map of vehicle distribution.

In an exemplary embodiment, sending the vehicle movement information of the present vehicle includes at least one of: sending the vehicle movement information of the present vehicle according to a preset time interval; or, when a vehicle movement mode of the present vehicle changes, sending the vehicle movement information of the present vehicle according to the changed vehicle movement mode, wherein the change of the vehicle movement mode includes at least one of: acceleration, deceleration, braking, lane changing, or overtaking.

In an exemplary embodiment, the vehicle movement processing method further includes receiving regional road condition information, wherein the regional road condition information includes at least one of: a road surface state, a weather state or a traffic state within a preset vehicle movement range, or braking distance indication information.

In an exemplary embodiment, the vehicle movement processing method further includes at least one of: acquiring or calculating a safe braking distance, and determining whether to send out a safety prompt message according to the safe braking distance, the position of the present vehicle in the map of vehicle distribution, and the distance between the present vehicle and the adjacent vehicle.

In a second aspect, an embodiment of the present disclosure further provides a vehicle movement processing method, including: receiving vehicle movement information sent by all vehicles within a preset service range; and sending regional vehicle movement information to a target vehicle, wherein the regional vehicle movement information includes vehicle movement information of all vehicles within a preset vehicle movement range corresponding to the target vehicle, and the regional vehicle movement information is used for the target vehicle to display a map of vehicle distribution; wherein, the map of vehicle distribution displayed by the target vehicle includes a positional relationship of all vehicles within the preset vehicle movement range.

In an exemplary embodiment, the vehicle movement processing method further includes sending regional road condition information to the target vehicle, wherein the regional road condition information is used for the target vehicle to acquire a safe braking distance, and the regional road condition information includes at least one of: a road surface state, a weather state or a traffic state within the preset vehicle movement range, or braking distance indication information, corresponding to the target vehicle.

In an exemplary embodiment, before sending the regional road condition information, the method further includes: generating the braking distance indication information according to at least one of the road surface state, the weather state, or the traffic state.

In an exemplary embodiment, preset vehicle movement ranges corresponding to target vehicles are the same, and the preset vehicle movement ranges are the same as the preset service range; or, preset vehicle movement ranges corresponding to at least two of target vehicles are different.

In a third aspect, an embodiment of the present disclosure further provides a vehicle, including a memory and a processor, wherein: the memory is configured to store executable instructions; and the processor is configured to implement any one of the vehicle movement processing methods as described in the first aspect when executing the executable instructions stored in the memory.

In an exemplary embodiment, the vehicle further includes at least one of: a global positioning system, configured to acquire positioning information of the vehicle; a ranging radar, configured to detect a distance between the vehicle and an adjacent vehicle in real time; a camera, configured to monitor a quantity of lanes during movement of the vehicle and detect a lane on which the vehicle moves; or, a display, configured to display a map of vehicle distribution.

In a fourth aspect, an embodiment of the present disclosure further provides a mobile terminal, which includes a memory and a processor, wherein: the memory is configured to store executable instructions; and the processor is configured to implement the vehicle movement processing method described in any one of the first aspect when executing the executable instructions stored in the memory.

In a fifth aspect, an embodiment of the present disclosure further provides a server, which includes a memory and a processor; the memory is configured to store executable instructions; and the processor is configured to implement the vehicle movement processing method described in any one of the second aspect when executing the executable instructions stored in the memory.

In a sixth aspect, an embodiment of the present disclosure further provides a vehicle movement system, which includes a server as described in any one of the above, and at least one vehicle as described in any one of the above within a service range of the server.

In a seventh aspect, an embodiment of the present disclosure further provides a computer readable storage medium, in which executable instructions are stored, and the vehicle movement processing method in any one of the first aspect is implemented when the executable instructions are executed by a processor, or, the vehicle movement processing method in any one of the second aspect is implemented when the executable instructions are executed by a processor.

Other aspects will become apparent upon reading and understanding accompanying drawings and the detailed description.

BRIEF DESCRIPTION OF DRAWINGS

Accompanying drawings are used for providing an understanding of technical solutions of the present disclosure and form a part of the specification. They do not constitute a limitation on the technical solutions of the present disclosure.

DETAILED DESCRIPTION

Hereinafter embodiments of the present disclosure will be described in detail with reference to the accompanying drawings. The embodiments and features in the embodiments in the present disclosure may be combined randomly if there is no conflict. Embodiments provided by the present disclosure may be combined with each other, and same or similar concepts or processes may not be repeated in some embodiments.

Acts shown in a flowchart of the drawings may be performed in a computer system such as a set of computer executable instructions. Moreover, although a logical sequence is shown in the flowchart, in some cases, the acts shown or described may be performed in a sequence different from that shown.

Figure 1:
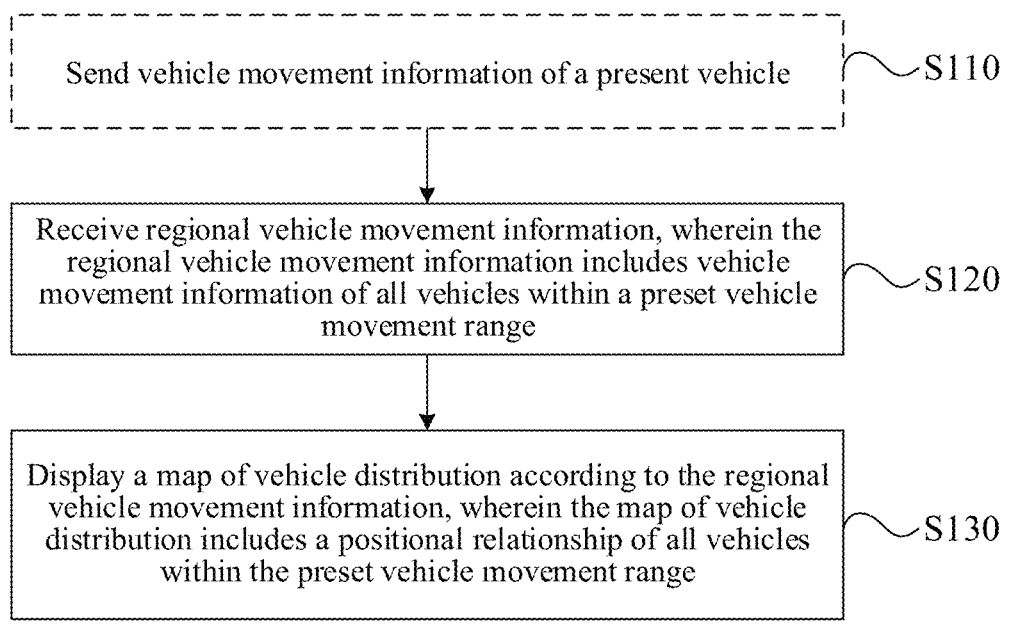
FIG. 1 is a flowchart of a vehicle movement processing method according to an embodiment of the present disclosure.

FIG. 1 is a flowchart of a vehicle movement processing method according to an exemplary embodiment of the present disclosure. The vehicle movement processing method according to the present exemplary embodiment may be used for a driver to know a real-time state during vehicle movement through a vehicle when driving the vehicle. The vehicle movement processing method may be performed by a vehicle driven by a driver, and the vehicle may perform vehicle movement processing through communication with a server or an access point. As shown in FIG. 1, the vehicle movement processing method according to the present exemplary embodiment may include acts S110 to S130.

In S110, vehicle movement information of a present vehicle is sent.

Optionally, the present vehicle may send the vehicle movement information of the present vehicle in real time.

In S120, regional vehicle movement information is received, wherein the regional vehicle movement information includes vehicle movement information of all vehicles within a preset vehicle movement range.

A vehicle that performs vehicle movement safety processing may monitor, according to a vehicle movement condition of vehicles within a certain vehicle movement range on the periphery, a vehicle movement mode of the present vehicle in real time. Vehicles in the embodiment of the present disclosure may be any vehicle within a service range of the server, that is, vehicle movement safety processing of each vehicle within the service range may be performed by using the vehicle movement processing method provided by the embodiment of the present disclosure. These vehicles send vehicle movement information of their present vehicles to the server, and vehicle movement information of another vehicle may be known through the regional vehicle movement information issued by the server.

In an exemplary embodiment, the vehicle movement information may include inherent information of the vehicle and current information of vehicle movement mode (for being displayed as state information in a map of vehicle distribution). Herein, the inherent information of the vehicle includes, for example, one or more pieces of following information: an identification code of the vehicle (a unique identification of the vehicle, which may be a frame number or an engine number, etc.), a license plate number, and a fixed identification feature of the vehicle after production or after a driving license is handled. The information of vehicle movement mode may include, for example, one or more pieces of following information: lane information, speed information (e.g., a current vehicle speed), steering information (e.g., a steering direction), speed change information (e.g., an acceleration or a deceleration), or braking information (e.g., whether a brake pedal is pressed down at present) of vehicle movement. The above information of vehicle movement mode may be detected in real time by an Electronic Control Unit (ECU) (also known as a vehicle driving computer or a vehicle-mounted computer) of the vehicle. The above vehicle movement information may further include positioning information of the vehicle, for example, a Global Positioning System (GPS) position, wherein the GPS position may be acquired in real time by a GPS module configured by the vehicle to determine a position of the vehicle. In another embodiment, in addition to using a GPS System to acquire positioning information, another positioning system may also be used or used in combination, and another positioning system includes, for example, Beidou Satellite Navigation System, GLONASS System, or Galileo Satellite Navigation System.

The vehicle may acquire one or more pieces of the above vehicle movement information according to an actual vehicle movement situation of the vehicle. For example, when a certain vehicle sends vehicle movement information of the present vehicle for the first time, the vehicle movement information may include an identification code of the present vehicle, a license plate number, a GPS position, and a speed. If the vehicle is currently turning, the vehicle movement information may further include a steering direction or an acceleration. If the vehicle is currently braking, the vehicle movement information may further include information related to braking.

In an exemplary embodiment, after a certain vehicle acquires the vehicle movement information of the present vehicle in real time, the acquired vehicle movement information of the present vehicle is sent out for performing, by another vehicle within a certain vehicle movement range, vehicle movement safety processing according to the vehicle movement information sent thereby. Sending the vehicle movement information of the present vehicle by the above vehicle may be, for example, sending it to a server within a vehicle movement range in which the vehicle is located, and that the server may receive vehicle movement information sent by all vehicles within its service range, and send the vehicle movement information received by the present server to these vehicles, or, after performing data processing and a comprehensive analysis on the vehicle movement information received thereby, send it to these vehicles.

The regional vehicle movement information in the embodiment of the present disclosure includes vehicle movement information of all vehicles within a preset vehicle movement range. The preset vehicle movement range (i.e., the aforementioned vehicle movement range) may be the same as or different from the service range. In an exemplary embodiment, the preset vehicle movement range may be the preset service range of the server in the service region to which the vehicle belongs, that is, the server sends same regional vehicle movement information to all vehicles within the preset service range. In another exemplary embodiment, the preset vehicle movement range may be a preset range centered on the vehicle and radiating to the surroundings. For example, the regional vehicle movement information sent to vehicle A is the vehicle movement information of all vehicles within 200 meters (m) in front of and behind vehicle A. In this implementation, the server may perform a data analysis and processing on all the vehicle movement information received thereby, and determine the vehicle movement information of all vehicles within the preset vehicle movement range to which the vehicle belongs to be sent to each vehicle according to a GPS position and a current road condition of each vehicle, that is, contents of regional vehicle movement information sent by the server to vehicles in different positions may be different. A distance range of radiation may be set by the system. For example, the preset vehicle movement range of vehicles in a freeway mode may be larger than that in an urban road mode. Or the distance range of radiation may be set by a user itself.

In S130, a map of vehicle distribution is displayed according to the regional vehicle movement information, wherein the map of vehicle distribution includes a positional relationship of all vehicles within the preset vehicle movement range.

The map of vehicle distribution is used for graphically displaying the positional relationship of all vehicles within the preset vehicle movement range. Optionally, a vector diagram may be generated to display the positional relationship of all vehicles within the preset vehicle movement range. By generating a vector map of vehicle distribution from the regional vehicle movement information, the zooming in or zooming out operation on the map will not be distorted, and there is no need for complex video image processing.

Optionally, the map of vehicle distribution may further include lanes (such as all driving lanes within a vehicle movement range) and/or state information of vehicles.

In an exemplary embodiment, after the vehicle receives the above-mentioned regional vehicle movement information, it may know the vehicle movement information of all vehicles within a certain vehicle movement range on the periphery of the present vehicle (for example, the above-mentioned preset vehicle movement range), and since display screens are usually installed inside current vehicles, wherein the display screen is, for example, disposed in an integrative mode with a vehicle driving computer on a center console of the vehicle. Therefore, the vehicle driving computer may display the processed map of vehicle distribution on the display screen of the vehicle according to the above-mentioned regional vehicle movement information, wherein a content displayed in the map of vehicle distribution is based on the above-mentioned regional vehicle movement information, and the map of vehicle distribution may include the positional relationship of all vehicles within the preset vehicle movement range, and optionally, may further include lanes and/or state information of vehicles.

Figure 2:
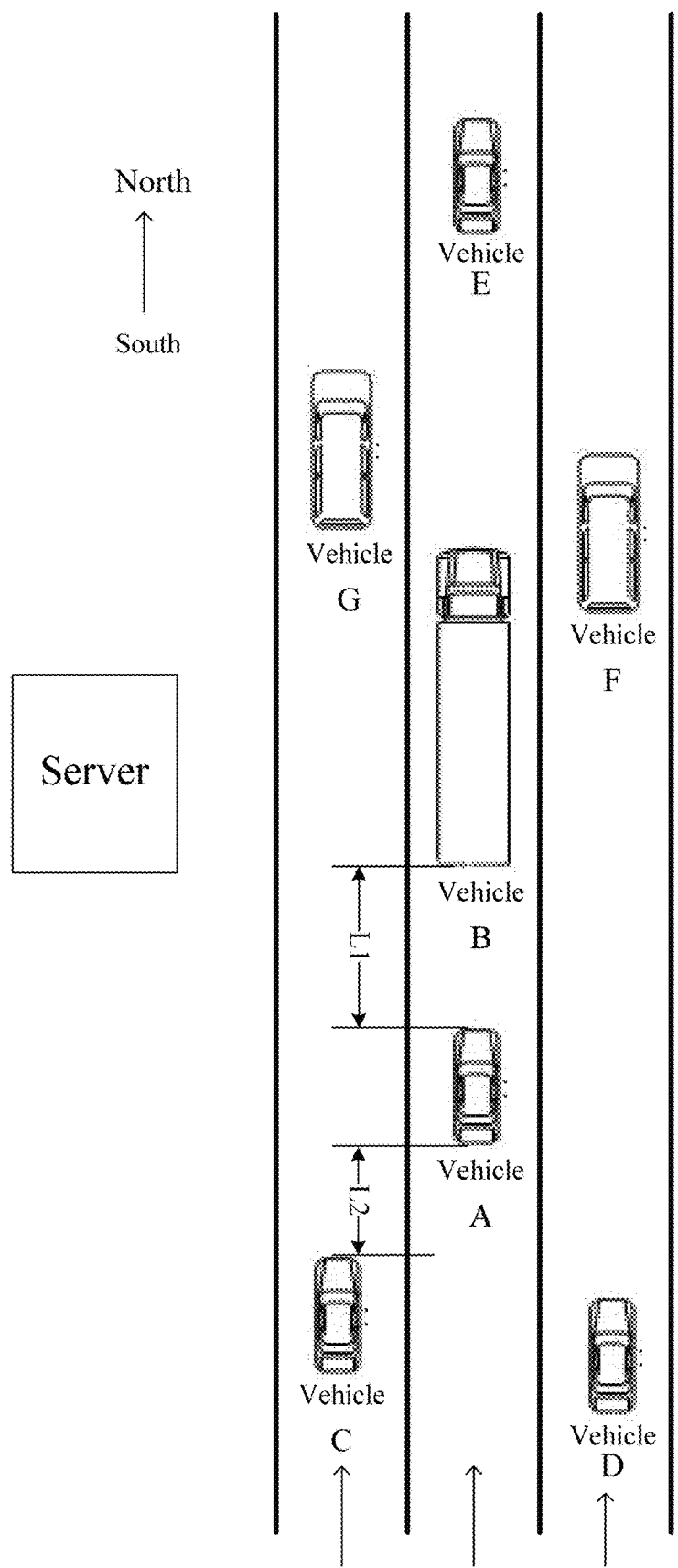
FIG. 2 is a schematic diagram of a system framework for vehicle movement processing according to an embodiment of the present disclosure.

FIG. 2 shows an exemplary schematic diagram of a system framework. FIG. 2 illustrates vehicle A to vehicle G, as well as a server within a vehicle movement range where the vehicles are located. Among them, vehicle A as well as vehicle C to vehicle E are small-sized vehicles, vehicle F and vehicle G are medium-sized vehicles, and vehicle B is a large-sized vehicle. FIG. 2 may be taken as an example of a map of vehicle distribution. Vehicles may carry the vehicle type information of their present vehicles in reported vehicle movement information, and the vehicle that receives the regional vehicle movement information uses a corresponding icon (e.g., a small-sized vehicle icon, a medium-sized vehicle icon, or a large-sized vehicle icon) to identify the corresponding vehicle according to the vehicle type information carried in the regional vehicle movement information.

Figure 3:
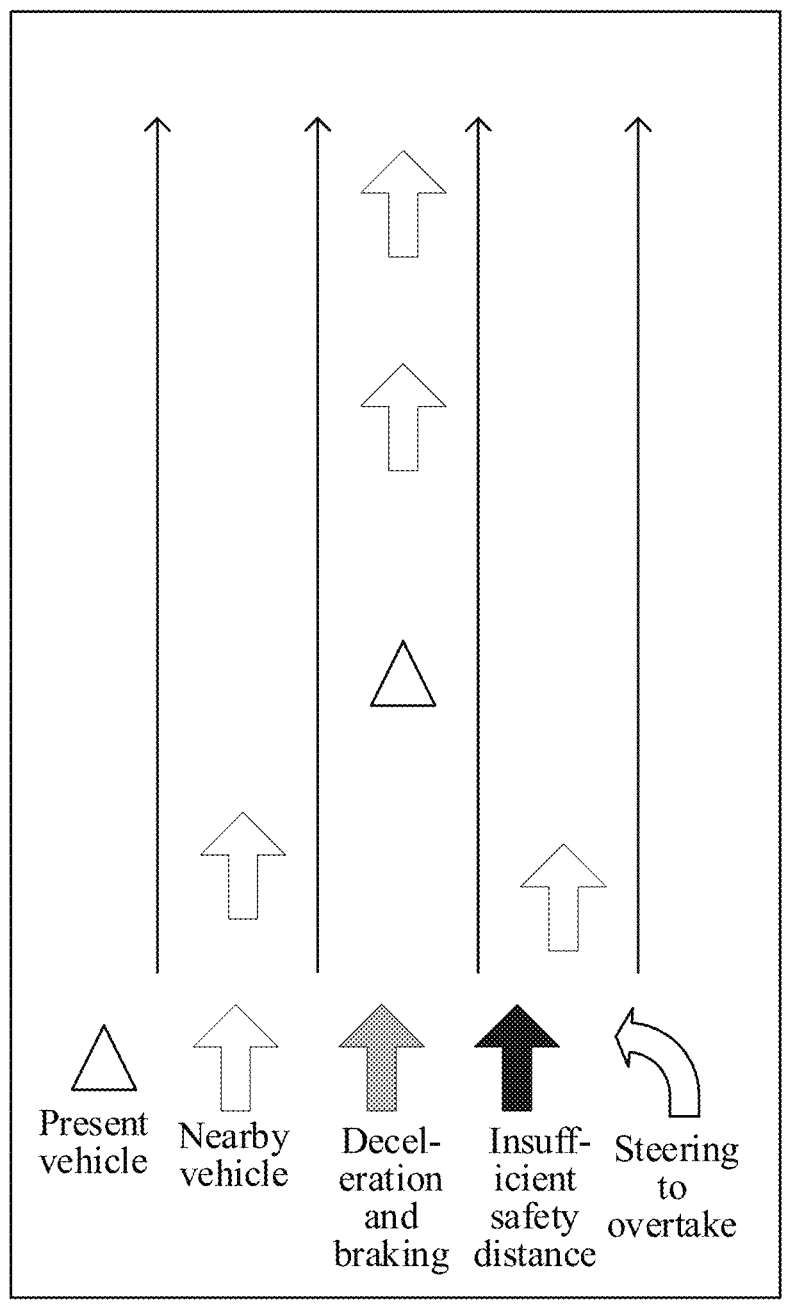
FIG. 3 is a schematic diagram of a map of vehicle distribution displayed by using a vehicle movement processing method according to an embodiment of the present disclosure.

FIG. 3 shows a schematic diagram of another exemplary map of vehicle distribution. The map of vehicle distribution shown in FIG. 3 is illustrated by taking the vehicle condition shown in FIG. 2 as an example, and vehicles A to G are schematically illustrated in the map of vehicle distribution shown in FIG. 3. In the map of vehicle distribution shown in FIG. 3, it is illustrated by taking the distribution map displayed on the vehicle A as an example, that is, the map of vehicle distribution shown in FIG. 3 shows the vehicle information within a certain vehicle movement range in front of and behind the vehicle A centered on the vehicle A. FIG. 3 schematically shows a relative positional relationship between vehicle A and vehicle G, including, for example, a front-rear relationship and a left-right relationship, wherein the front-rear relationship may be reflected by a distance between the vehicle A and another vehicle, and the left-right relationship may be reflected by a lane where each vehicle is located. Optionally, if the lane is not shown, the left-right positional relationship may indicate that the vehicles are in different lanes. Optionally, the positional relationship diagram may also reflect state information of each vehicle, for example, the vehicles traveling at a constant speed and speeding up are marked by different colors, and for another example, the vehicles turning, overtaking or turning around are marked by turning arrows.

The maps of vehicle distribution shown in FIG. 2 and FIG. 3 are only examples. In other embodiments, the exhibition forms of the maps of vehicle distribution may have various changes, as long as the positional relationship between the vehicles can be illustrated. Optionally, various different exhibition forms of the maps of vehicle distribution may be given for users to choose and use.

In an exemplary embodiment, using different exhibition forms of the maps of vehicle distribution in different road modes may be set by system default or by a user itself. For example, the exhibition form of the map of vehicle distribution shown in FIG. 2 is used in an urban road mode, and the exhibition form of the map of vehicle distribution shown in FIG. 3 is used in a freeway mode. The urban road mode and the freeway mode described herein are only examples for explanation, and another type of road mode or more than two road modes may be set in other embodiments, which is not limited here.

In an exemplary embodiment, since the positional relationship of all vehicles within the preset vehicle movement range may be reflected in the map of vehicle distribution, the server may perform a comprehensive analysis and data processing on the vehicle movement information of all vehicles received thereby before sending the regional vehicle movement information, for example, it may generate relative positional relationships of all vehicles according to positioning information (such as a GPS position) of each vehicle in the received information, so that the processing and display speeds of vehicles after receiving the regional vehicle movement information are faster, and the map of vehicle distribution may be displayed more efficiently.

The vehicle movement processing method provided by the exemplary embodiment of the present disclosure may be realized by using existing hardware of a current vehicle, for example, a GPS position of the present vehicle is acquired through a GPS module, an identification code of the present vehicle, a license plate number and related vehicle movement state information are acquired through a vehicle driving computer, vehicle movement information of the present vehicle is sent by the vehicle driving computer, and regional vehicle movement information sent by a server is received and processed, displaying a map of vehicle distribution by a display screen configured in the vehicle. Each vehicle sends out vehicle movement information of the present vehicle, and vehicles within a certain vehicle movement range around it all obtain the vehicle movement information of all vehicles within a corresponding preset vehicle movement range thereof, so that each vehicle may know relative positional relationships between itself and other vehicles. In one aspect, vehicles performing the vehicle movement processing method according the exemplary embodiment of the present disclosure do not need to install hardware additionally, because most vehicles are equipped with a vehicle driving computer, a positioning module, a camera (which may be used to determine a quantity of lanes), a radar and a central control display screen, so realization cost of hardware is relatively low and the hardware is not easy to be damaged. In another aspect, in a case of emergency, response time is relatively short, and vehicles ahead may vary constantly in actual vehicle movement, vehicle movement information within a larger vehicle movement range may be displayed in the central control display screen of the present vehicle, and the driver may know positions and vehicle movement states of vehicles within a larger vehicle movement range, which is beneficial for a driver making a faster reaction during vehicle movement.

In an exemplary embodiment, for a vehicle without a display screen, or for a user who wants to display a map of vehicle distribution through another device, the present embodiment provides a vehicle movement processing method, which includes the above acts 120 and 130. For example, a mobile terminal may receive regional vehicle movement information and process the regional vehicle movement information to display it as a map of vehicle distribution. At this time, vehicle movement information of the present vehicle may still be sent by a vehicle driving computer of the vehicle, and the mobile terminal may automatically match with the present vehicle according to positioning information in the regional vehicle movement information, or, a user may conduct manual matching according to inherent information of the vehicle, and after the matching, the mobile terminal may identify the present vehicle in the map of vehicle distribution. The mobile terminal may be, for example, a mobile phone, a tablet computer or a laptop computer, etc. In an exemplary embodiment, the mobile terminal may be installed with an application program, through which the above-mentioned vehicle movement processing method is realized.

According to the vehicle movement processing method provided by the embodiment of the present disclosure, a vehicle may send vehicle movement information of the present vehicle and receive regional vehicle movement information within a vehicle movement range of the vehicle, or a driver may receive regional vehicle movement information within a vehicle movement range where the vehicle is located through a mobile terminal, wherein the regional vehicle movement information may include vehicle movement information of all vehicles within a preset vehicle movement range. The received regional vehicle movement information is used for the vehicle or the mobile terminal to display a map of vehicle distribution, wherein the map of vehicle distribution may include positional relationships of all vehicles within the preset vehicle movement range, and in addition, the map of vehicle distribution may also include lanes and state information of each vehicle. According to the vehicle movement processing method provided by the embodiment of the present disclosure, a driver of the vehicle may know positional relationships of vehicles within a larger vehicle movement range (compared with a visual range that the driver can see) according to the displayed map of vehicle distribution. Optionally, the driver may also know vehicle movement states of the vehicles within the vehicle movement range, which is beneficial for the driver knowing a road condition ahead in time and make a faster reaction during vehicle movement, that is, safety of driving the vehicle by the driver may be improved to a great extent. In addition, the vehicle movement processing method according to the embodiment of the present disclosure may be realized based on a current existing hardware configuration of the vehicle, which avoids a problem of high cost brought by a large-scale installation of hardware configuration.

Optionally, in the embodiment of the present disclosure, the vehicle movement information of the present vehicle sent by the vehicle may include not only the contents exemplified in the above embodiments, but also distance information of the present vehicle and an adjacent vehicle (e.g., the present vehicle and adjacent vehicles in the front, the rear, the left, and the right). For example, when the present vehicle has an omnibearing ultrasonic radar, distances between the present vehicle and the adjacent vehicles in the front, the rear, the left, and the right may be detected, or when the present vehicle has a radar in the front and the rear, distances between the present vehicle and the adjacent vehicles in the front and the rear may be detected.

In another exemplary embodiment, the vehicle movement information may include inherent information and distribution information of vehicles, for example, the inherent information may include, for example, one or more of the aforementioned identification code, the license plate number, or the fixed identification feature, and the distribution information may include, for example, the aforementioned positioning information. When the server integrates the received vehicle movement information sent by one or more vehicles into regional vehicle movement information according to a region and sends it to the vehicles in the region, the device that receives the regional vehicle movement information may calculate and graph the map of vehicle position distribution in the region according to distribution information of multiple vehicles in the region, to display it to a driver of the current vehicle. In an exemplary embodiment, the distribution information may further include lane information, such as a lane where the vehicle is located (e.g., a fast lane, a slow lane or an overtaking lane, etc.), then the device that receives the regional vehicle movement information may display lanes on the graphed map of vehicle position distribution, and when graphing vehicle positions, perform the graphing according to the lane where the vehicle is located. It is more convenient for the driver to watch in combination with the lane information. In an exemplary embodiment, the vehicle movement information may further include information of vehicle movement mode, including, but is not limited to, one or more pieces of following information: speed information, steering information, speed change information, or braking information.

In an exemplary embodiment, the speed information may include a speed value or a speed range identifier (for example, for identifying which preset vehicle speed range a current vehicle speed is in). When the vehicle movement information includes speed information, the vehicle receiving the regional vehicle movement information may display speeds of part of or all of the vehicles on the graphed map of vehicle position distribution according to the speed information. Whether displaying the speeds of part of or all of the vehicles may depend on a setting of a user or displaying is performed according to a default setting of the system. The displayed speed may directly identify a value of the speed, or explicitly identify a vehicle speed range where the vehicle is through different colors or shapes or another mode.

In an exemplary embodiment, the steering information may include a left-turn indication or a right-turn indication, and a current vehicle may decide whether to send the steering information according to whether a user stirs a steering indicator control stick or may send the steering information according to a steering wheel rotation angle (for example, when it is greater than a preset angle threshold). At this time, the steering information may further include a turning around indication. When the vehicle movement information includes the steering information, the vehicle receiving the regional vehicle movement information may identify a vehicle(s) to be turned or being turned on the graphed map of vehicle position distribution according to the steering information. For example, in a highway mode, the driver may judge whether the vehicle is going to overtake according to the steering information of the vehicle.

In an exemplary embodiment, the steering information may include an acceleration indication or a deceleration indication. When the vehicle movement information includes speed change information, the vehicle receiving the regional vehicle movement information may identify the accelerating or decelerating vehicle on the graphed map of vehicle position distribution according to the speed change information.

In an exemplary embodiment, a deceleration threshold may be preset, and when the vehicle decreases from a first speed to a second speed within preset time (which may be a relatively short time range), and a speed difference value between the first speed and the second speed is greater than the deceleration threshold, braking information is carried in the vehicle movement information. The braking information may be a braking icon or a speed difference value. When the vehicle movement information includes the braking information, the vehicle receiving the regional vehicle movement information may identify the vehicle currently braking or the speed difference value on the graphed map of vehicle position distribution according to the braking information.

In an exemplary embodiment, the server may determine, according to a position where a target device (a vehicle or a mobile terminal) is located, a vehicle movement range of the target device, and send vehicle movement information of other vehicles within the vehicle movement range to the target device as regional vehicle movement information.

Figure 4:
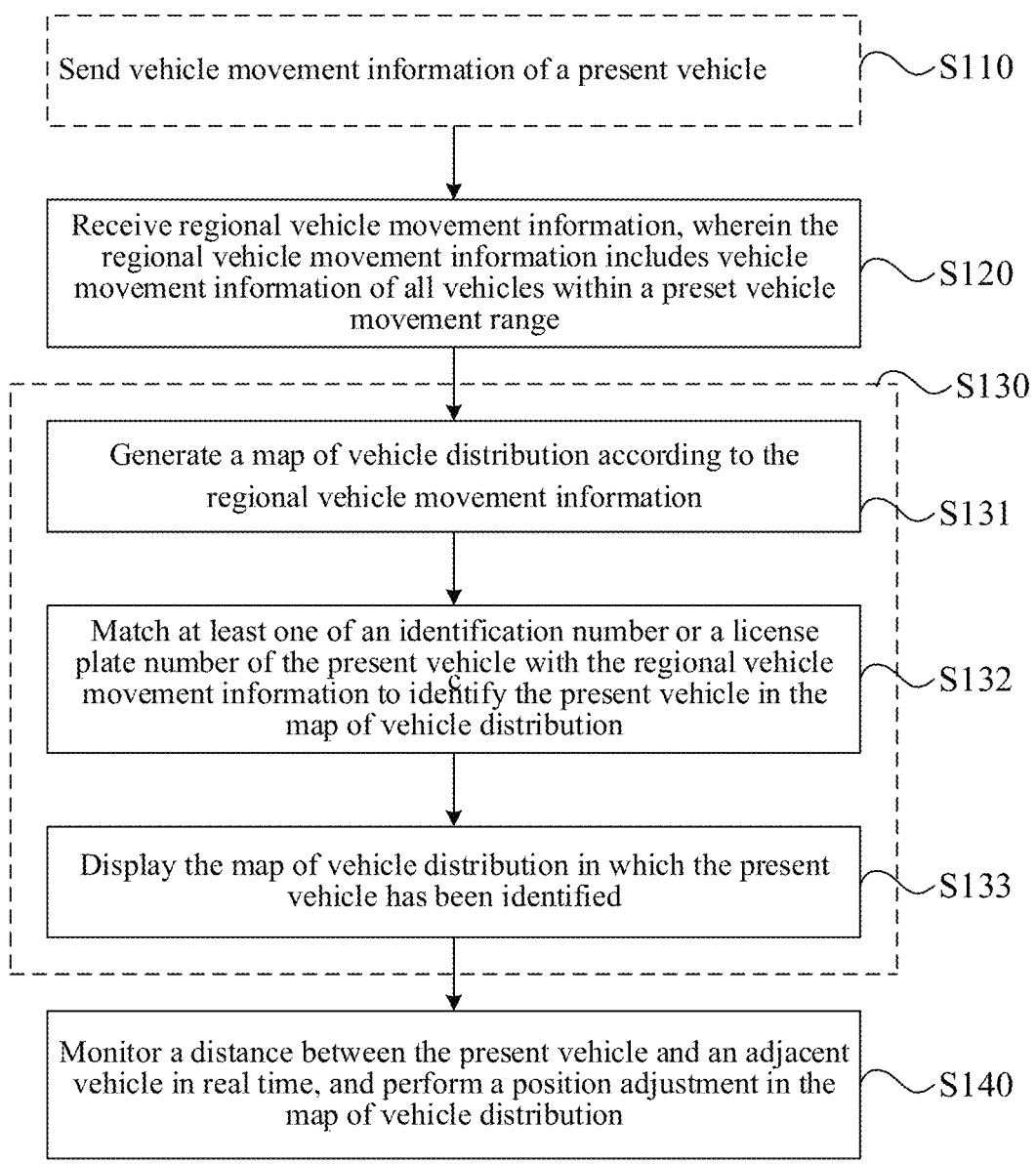
FIG. 4 is a flowchart of another vehicle movement processing method according to an embodiment of the present disclosure.

Optionally, FIG. 4 is a flowchart of another vehicle movement processing method according to an embodiment of the present disclosure. On the basis of the embodiment shown in FIG. 1, in the vehicle movement processing method provided by the exemplary embodiment shown in FIG. 3, the implementation of S130 may include acts S131 to S133.

In S131, a map of vehicle distribution is generated according to regional vehicle movement information.

In S132, at least one of an identification number or a license plate number of a present vehicle is matched with the regional vehicle movement information to identify the present vehicle in the map of vehicle distribution.

In S132, the map of vehicle distribution in which the present vehicle has been identified is displayed.

The aforementioned embodiments have explained that the vehicle may display the map of vehicle distribution on its internally configured display screen or display, by using a mobile terminal by a driver, the map of vehicle distribution. In an exemplary implementation, for example, a map of vehicle distribution marked with all vehicles within a preset range may be generated according to a GPS position of each vehicle within the preset range in the received regional vehicle movement information. In another exemplary implementation, the server may perform data processing and a comprehensive analysis on the vehicle movement information of all vehicles received by the server, and generates regional vehicle movement information sent to each vehicle. In this implementation, the regional vehicle movement information includes not only the GPS position of each vehicle, but also a distance between adjacent vehicles. In this way, calculation time of a vehicle or a mobile terminal in a process of generating a map of vehicle distribution may be reduced, improving speed for displaying the map of vehicle distribution.

After generating the above-mentioned map of vehicle distribution, the vehicle in the embodiment of the present disclosure may match its own identification number and/or license plate number with the regional vehicle movement information received thereby. For example, no matter whether the regional vehicle movement information is the vehicle movement information of all vehicles within the service range of the server or the vehicle movement information of all vehicles within the preset vehicle movement range corresponding to vehicle A, the regional vehicle movement information may include the vehicle movement information of the vehicle A. Therefore, when the identification number and/or the license plate number of the vehicle A is matched with the regional vehicle movement information, the vehicle A may be found among all vehicles in the map of vehicle distribution generated by the regional vehicle movement information and identified in the map of vehicle distribution. That is, each vehicle may identify the present vehicle in the map of vehicle distribution displayed on its display screen, so that the driver clearly knows, from the map of vehicle distribution, states of vehicles on the periphery of the present vehicle, such as a density degree of vehicles on the periphery of the present vehicle, distances between front and rear adjacent vehicles, or vehicle movement states of all vehicles within a preset vehicle movement range, or other information. In the map of vehicle distribution shown in FIG. 3, a regular triangle icon is used for identifying the present vehicle (i.e., the vehicle A) in the map of vehicle distribution, an unfilled arrow indicates nearby vehicles within a preset range on the periphery of the vehicle A and that these vehicles are running at a normal speed, a gray filled arrow indicates a deceleration or braking vehicle, a black filled arrow indicates that a safe braking distance between the present vehicle and that vehicle is insufficient, and a curved arrow indicates that a vehicle turns or overtakes, etc. Not all of the vehicles in FIG. 2 are illustrated in FIG. 3, and only part of the vehicles concerning safe vehicle movement of the vehicle A are illustrated.

In another exemplary embodiment, the above act S130 may include acts S131' to S132'. In S131', at least one of the identification number or the license plate number of the present vehicle is matched with the regional vehicle movement information to search for the vehicle movement information of the present vehicle.

In S132', the map of vehicle distribution is graphed, selecting a corresponding graphic icon for the graphing according to the vehicle movement information of each vehicle.

In S133', the graphed map of vehicle distribution is displayed.

To sum up, displaying a map of vehicle distribution according to the regional vehicle movement information in the act includes: generating and displaying the map of vehicle distribution in which the present vehicle is identified according to the regional vehicle movement information, and determining the position of the vehicle in the map of vehicle distribution according to the positioning information in the regional vehicle movement information. The identification of the present vehicle may be realized by matching the inherent information of the present vehicle with the inherent information in the regional vehicle movement information.

The displayed map of vehicle distribution according to the embodiment of the present disclosure is not a real-time video image, that is, the vehicle movement processing method provided by the embodiment of the present disclosure does not need to display real image information of front and rear roads in real time, but only needs to transmit the regional vehicle movement information and graphically display a vehicle distribution situation of part of road sections, as well as display data such as vehicle states. It may be, for example, a vectorized graph after simple arithmetic processing, and a vehicle distribution vector map (i.e., a map of vehicle distribution in a form of a vector map) may be generated according to the positioning information of all vehicles in the received regional vehicle movement information, a position of a vehicle in the map of vehicle distribution being decided by positioning information of the vehicle, so the map of vehicle distribution may reflect positional relationships of all vehicles within a preset vehicle movement range. The map of vehicle distribution is used for reflecting the positional relationship of all vehicles within the preset vehicle movement range. The vectorized graph may identify a vehicle movement direction of a current road (which may be implicitly identified by a direction of the front of the vehicle or explicitly identified by a direction of an arrow). As shown in FIG. 3, a vehicle movement direction of vehicle A is from south to north, and the vectorized graph also identifies a distribution situation of the vehicle A (taking the vehicle A being the present vehicle as an example for showing) and the front and rear vehicles. In the system framework shown in FIG. 2, L1 is a vehicle distance between the vehicle A and the vehicle in front of it (i.e., vehicle B), and L2 is a vehicle distance between the vehicle A and the vehicle behind it (i.e., vehicle C). Compared with video contents shot in real time, the data content of the vectorized graph greatly reduces system space occupied by a display content, which may improve processing speed of the vehicle by huge amounts. Moreover, the displaying of the vectorized graph (an exemplary implementation of the map of vehicle distribution according to the embodiment of the present disclosure) is more intuitive and clear, so that the driver sees road conditions and vehicle conditions on the periphery of the present vehicle at a glance, which is beneficial for the driver performing efficient analysis and making fast reaction, thus greatly improving vehicle movement safety. In addition, image distortion would not be caused by zooming of the vector graph of vehicle distribution.

Optionally, the vehicle movement processing method according to an embodiment of the present disclosure may further include act S140.

In S140, a distance between the present vehicle and an adjacent vehicle is monitored in real time, and a position adjustment is performed in the map of vehicle distribution.

During vehicle movement of a vehicle, a position of the present vehicle and positions of vehicles on the periphery of the present vehicle all change in real time. In an actual processing process, the method according to the embodiment of the present disclosure, may adjust the content of the currently displayed map of vehicle distribution through information such as position changes of the present vehicle as well as distances between the present vehicle and the adjacent vehicles. For example, when a radar of the present vehicle detects the change of the vehicle distance between the present vehicle and the adjacent vehicle, or, when the change of the vehicle distance between the present vehicle and the adjacent vehicle is monitored through positioning information, the positional relationship between the present vehicle and the adjacent vehicle in the map of vehicle distribution is adjusted. Correspondingly, the relative positional relationship of all vehicles within the range indicated by the map of vehicle distribution may also be adjusted. Optionally, the state information of vehicles whose vehicle movement states have changed in the map of vehicle distribution or the like may also be adjusted. The purpose of the adjustment is to display latest road and vehicle condition information, so that the driver may know vehicle movement states of vehicles within a certain range on the periphery in time.

Optionally, in the above embodiments of the present disclosure, the implementation in which a vehicle sends the vehicle movement information of the present vehicle may include one or more of following modes: in a first mode, the vehicle movement information of the present vehicle is sent according to a preset time interval; or, in a second mode, when a vehicle movement mode of the present vehicle changes, the vehicle movement information of the present vehicle is sent according to the changed vehicle movement mode, wherein the change of the vehicle movement mode includes at least one of: acceleration, deceleration, braking, lane changing, or overtaking.

In the embodiment of the present disclosure, the mode in which a vehicle sends vehicle movement information of the present vehicle may be set in a vehicle driving computer of the vehicle. Since the position and the vehicle movement mode of the vehicle change in real time, it may be configured to send the vehicle movement information of the present vehicle according to a certain time interval, such as 50 milliseconds (ms), so that other vehicles within the preset vehicle movement range may be made to know the vehicle movement state of the present vehicle in time. For example, the time interval may be different according to different road modes, e.g., the time interval in a freeway mode may be smaller than that in an urban road mode. In addition, the vehicle driving computer of the vehicle may monitor the vehicle movement mode of the present vehicle in real time, and when a change in the vehicle movement mode of the present vehicle is detected, the vehicle movement information of the present vehicle may be sent based on the changed vehicle movement mode, so that the vehicle movement state of the present vehicle may be sent to other vehicles within the preset vehicle movement range in time, which is beneficial for these vehicles displaying the changed maps of vehicle distribution on their own display screens, so that drivers know current vehicle condition information in real time.

Figure 5:
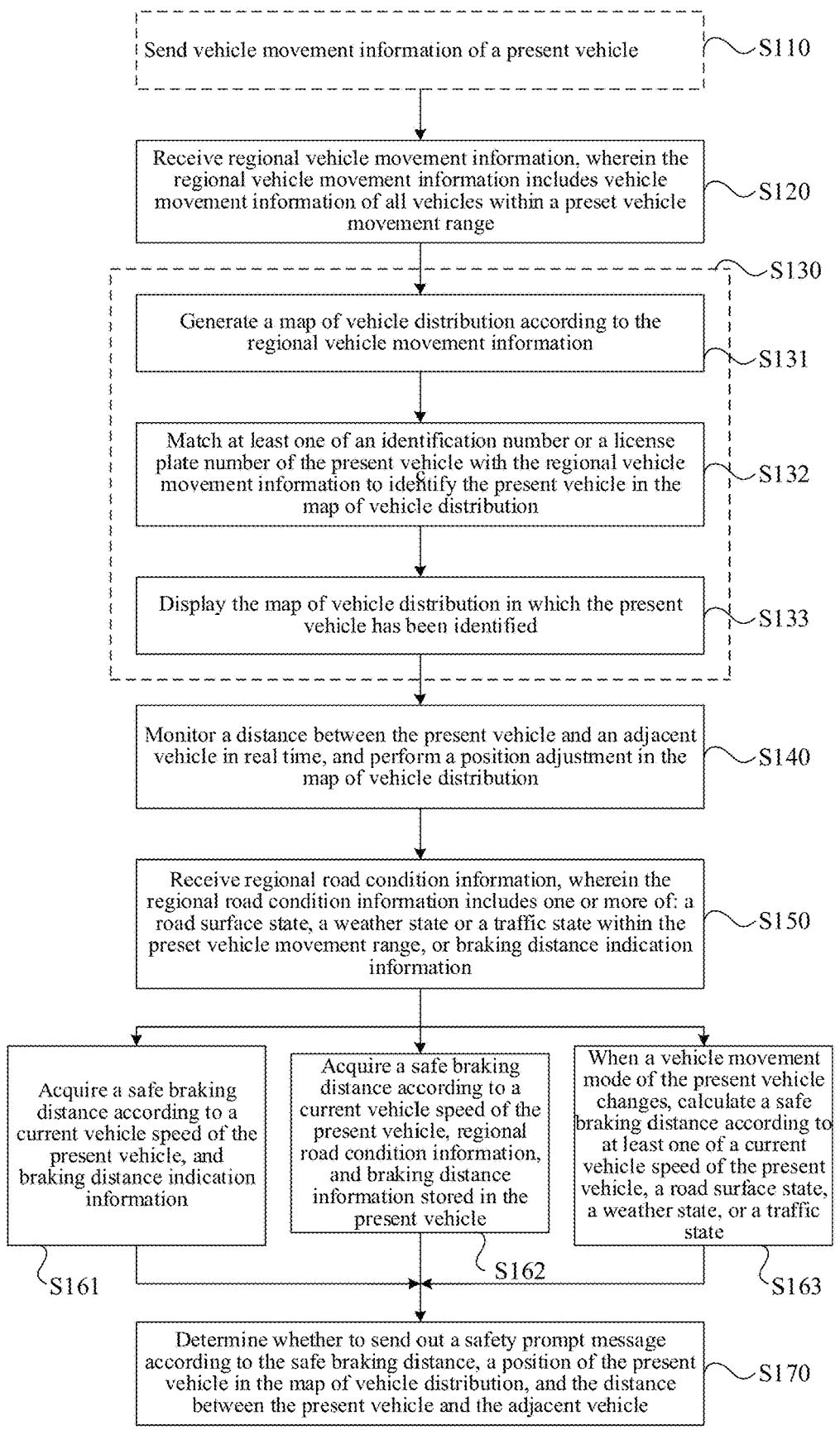
FIG. 5 is a flowchart of another vehicle movement processing method according to an embodiment of the present disclosure.

Optionally, FIG. 5 is a flowchart of another vehicle movement processing method according to an embodiment of the present disclosure. On the basis of the above embodiments, the vehicle movement processing method according to the present exemplary embodiment further includes a following act S150.

In S150, regional road condition information is received, wherein the regional road condition information includes at least one of: a road surface state, a weather state or a traffic state within a preset vehicle movement range, or braking distance indication information.

FIG. 5 is shown by taking being on the basis of the flowchart shown in FIG. 4 as an example. In the present exemplary embodiment, the server may send not only regional vehicle movement information but also regional road condition information to vehicles within the preset service range. For example, the server may query a road surface database (including, for example, a road surface type and/or a slope of a current road section, etc.), a real-time weather state (such as a sunny day, a cloudy day, or a rainy and snowy weather, etc.) and a real-time traffic state (for example, a traffic state such as a traffic jam, or an accident, etc.), and send these pieces of information to vehicles within a preset server range.

Optionally, the regional road condition information sent by the server includes braking distance indication information. The braking distance indication information may be generated by the server in combination with a current road surface state, a weather state and a traffic state. For example, the braking distance indication information is a functional relation between a suggested safe braking distance and a vehicle movement speed (e.g., an indication of which functional relation is applicable to) or a curve graph (for example, an indication of which curve graph is applicable to), or a keyword for querying a relationship table between a safe braking distance and a vehicle movement speed, etc. The braking distance indication information may be used for performing, by a vehicle, early warning of the safe braking distance to a driver during vehicle movement.

In an exemplary embodiment, a vehicle may get a safe braking distance for measuring relative safety between the present vehicle and vehicles on the periphery in various modes, and send out a safety prompt message for prompting a driver based on the safe braking distance. A following S161, S162, or S163 is several implementations in which the vehicle acquires the safe braking distance according to embodiments of the present disclosure.

As shown in FIG. 5, optionally, the vehicle movement processing method according to an embodiment of the present disclosure may further include: S161, a safe braking distance is acquired according to a current vehicle speed and braking distance indication information of the present vehicle; or S162, a safe braking distance is acquired according to a current vehicle speed, regional road condition information, and braking distance information stored in the present vehicle; or S163, when a vehicle movement mode of the present vehicle changes, the safe braking distance is calculated according to at least one of a current vehicle speed, a road surface state, a weather state, or a traffic state; wherein, the change in the vehicle movement mode includes at least one of: acceleration, deceleration, braking, lane changing, or overtaking.

For example, the regional road condition information received by the vehicle includes braking distance indication information. As explained above, the braking distance indication information may be a functional relation indication, or a curve graph indication, or a table lookup keyword, or the like between the suggested safe braking distance and the vehicle movement speed, then the vehicle may acquire the corresponding safe braking distance according to a current vehicle movement speed of the present vehicle.

For another example, the regional road condition information received by the vehicle includes the road surface state, such as a dry road surface or a slippery road surface, and braking distance information under different road conditions may be stored in the vehicle. Then the vehicle may get a safe braking distance suitable for a current road condition and a vehicle movement speed based on the received road condition and the stored braking distance information. Table 1 below shows a list of correspondence between vehicle movement speeds and safe braking distances when a road surface is dry, and Table 2 shows a list of correspondence between vehicle movement speeds and safe braking distances when a road surface is slippery.

TABLE 1

| Vehicle Speed (km/h) | Reaction Distance (m) | Safe Braking Distance (m) | Total Parking Distance (m) |
|---|---|---|---|
| 40 | 17 | 9 | 26 |
| 50 | 21 | 14 | 35 |
| 60 | 25 | 20 | 45 |
| 70 | 29 | 27 | 56 |
| 80 | 33 | 36 | 69 |
| 90 | 38 | 45 | 83 |
| 100 | 42 | 56 | 98 |
| 110 | 46 | 67 | 113 |

TABLE 2

| Vehicle Speed (km/h) | Reaction Distance (m) | Safe Braking Distance (m) | Total Parking Distance (m) |
|---|---|---|---|
| 40 | 17 | 13 | 30 |
| 50 | 21 | 20 | 41 |
| 60 | 25 | 29 | 54 |
| 70 | 29 | 40 | 69 |
| 80 | 33 | 52 | 85 |
| 90 | 38 | 65 | 103 |
| 100 | 42 | 80 | 122 |
| 110 | 46 | 87 | 143 |

The relationship between vehicle speeds and distances illustrated in Table 1 and Table 2 above is measured by taking general household vehicles as an example, and the braking distances illustrated in Table 1 and Table 2 above are merely an exemplary illustration. For vehicles with different types, manufacturers or models, braking distance information corresponding to the vehicles will also be different.

For another example, when the vehicle driving computer of the vehicle detects the change of the vehicle movement mode of the vehicle, it may be considered that the safe braking distance acquired by the vehicle may no longer be applicable to a current vehicle movement state. Therefore, the safe braking distance may be calculated based on at least one of a current vehicle speed of the present vehicle, a road surface state, a weather state, or a traffic state, and the change of the vehicle movement mode in this scenario may similarly include at least one of: acceleration, deceleration, braking, lane changing, or overtaking.

In an exemplary embodiment, the vehicle may obtain the safe braking distance according to one or more of the above-mentioned S161, S162 and S163. After getting the safe braking distance, the vehicle movement processing method according to an exemplary embodiment may further perform a following act S170.

In S170, whether to send out a safety prompt message is determined according to the safe braking distance, a position of the present vehicle in a map of vehicle distribution, and a distance between the present vehicle and an adjacent vehicle.

In an exemplary embodiment, based on the acquired safe braking distance, the vehicle driving computer of the vehicle may judge whether a distance between the present vehicle and a preceding vehicle (or a following vehicle) is close to or smaller than the safe braking distance according to the position of the present vehicle in the map of vehicle distribution and the distance between the present vehicle and the adjacent vehicle. When an actual distance between the present vehicle and the preceding vehicle is smaller than the safe braking distance, a safety prompt message may be sent, prompting the driver that the actual distance between the present vehicle and the preceding vehicle is smaller than the safe braking distance, or prompting the present vehicle that the actual distance may be adjusted through deceleration. When the actual distance between the present vehicle and the following vehicle is smaller than the safe braking distance, a safety prompt message may be sent out, prompting the driver that the actual distance between the present vehicle and the following vehicle is smaller than the safe braking distance, or prompting the present vehicle that the actual distance may be adjusted by accelerating. The present vehicle may also adjust the actual distance between the present vehicle and the adjacent vehicle through the change of another vehicle movement mode.

In the vehicle movement processing method provided by the embodiments of the present disclosure, the vehicle performs a comprehensive analysis according to the vehicle movement state of all vehicles within the preset vehicle movement range and on multiple factors (such as a vehicle movement speed, a road surface state, a weather state, a traffic state, and a safe braking distance, etc.) related to vehicle movement safety during vehicle movement, reminding the driver of the vehicle in real time, so as to improve vehicle movement safety.

Figure 6:
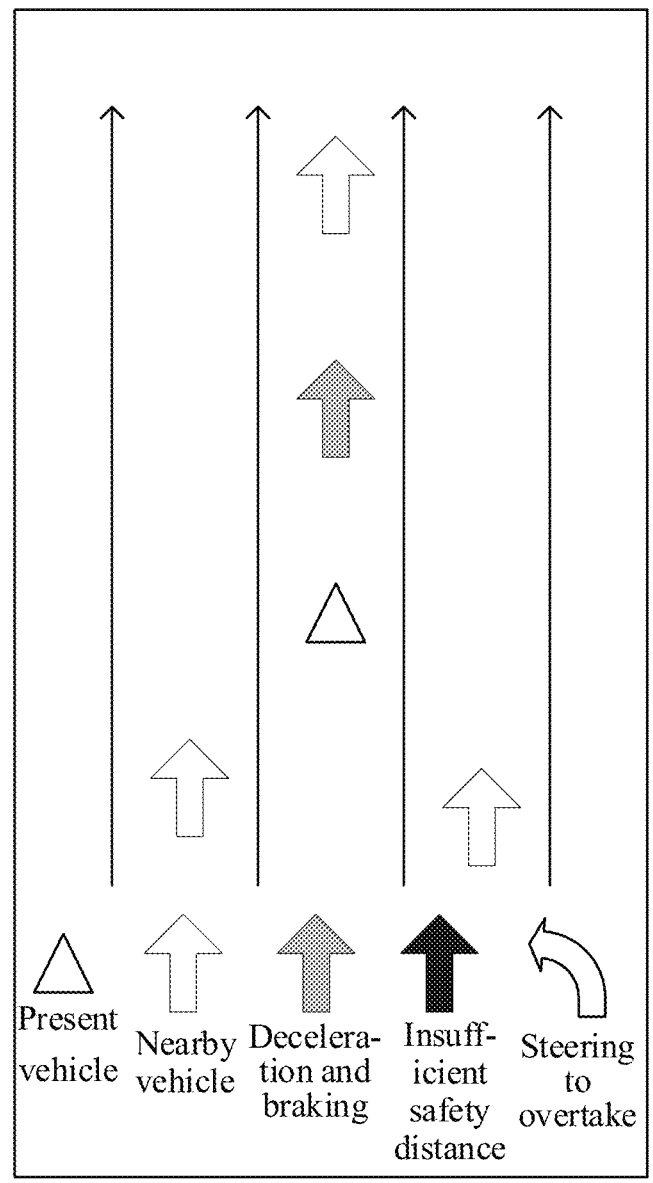
FIG. 6 is a schematic diagram of another map of vehicle distribution displayed by using a vehicle movement processing method according to an embodiment of the present disclosure.
Figure 7:
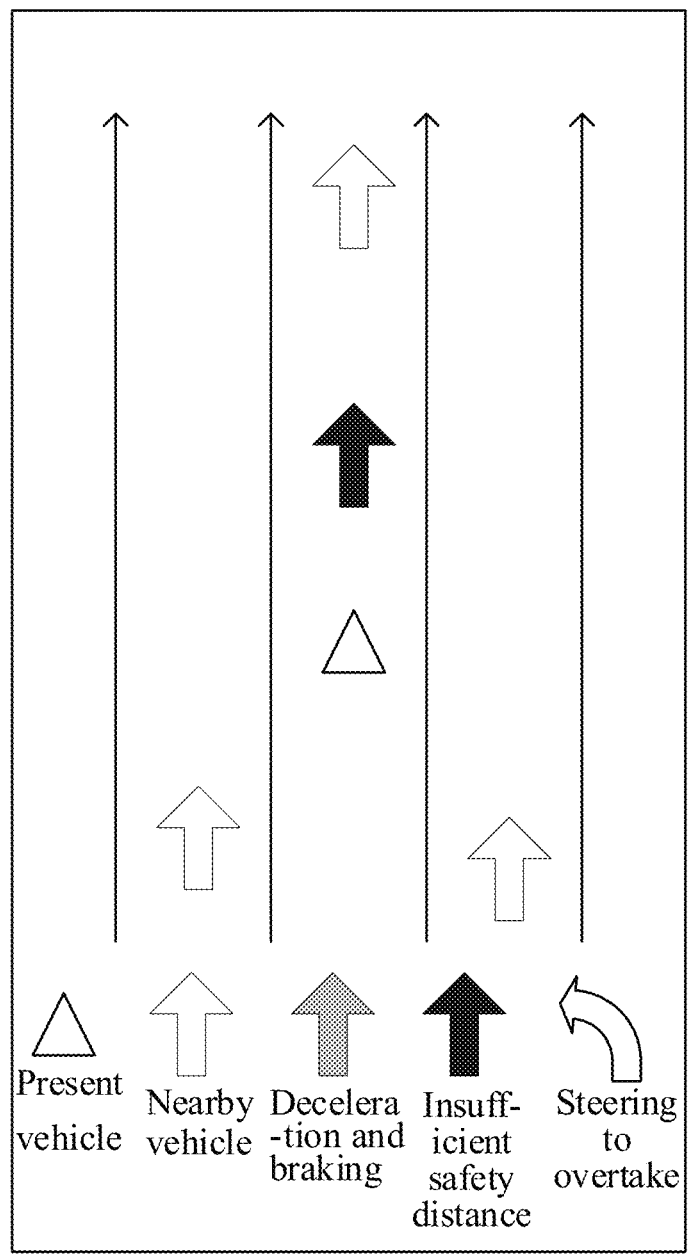
FIG. 7 is a schematic diagram of another map of vehicle distribution displayed by using a vehicle movement processing method according to an embodiment of the present disclosure.
Figure 8:
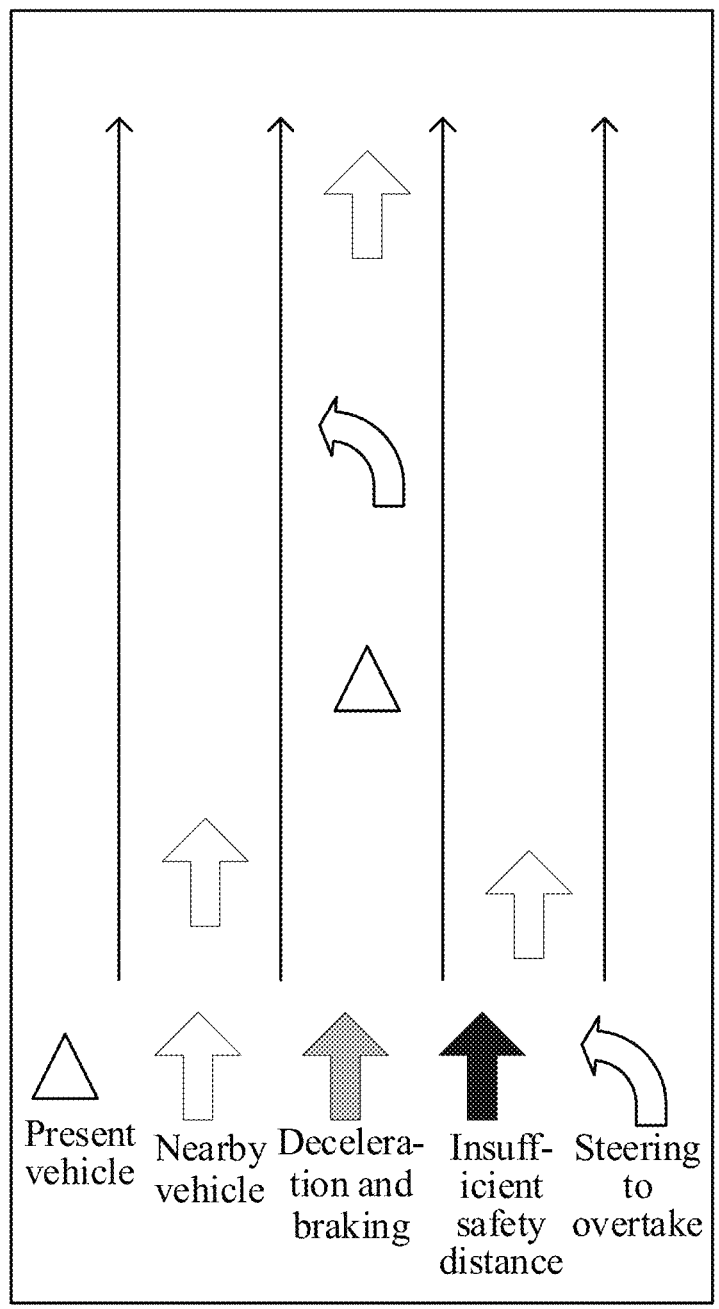
FIG. 8 is a schematic diagram of another map of vehicle distribution displayed by using a vehicle movement processing method according to an embodiment of the present disclosure.

An implementation of the map of vehicle distribution in the vehicle movement processing method provided by the embodiment of this disclosure will be explained by several exemplary maps of vehicle distribution. FIG. 6 is a schematic diagram of another map of vehicle distribution displayed by the vehicle movement processing method according to an embodiment of the present disclosure. FIG. 7 is a schematic diagram of another map of vehicle distribution displayed by the vehicle movement processing method according to an embodiment of the present disclosure. FIG. 8 is a schematic diagram of another map of vehicle distribution displayed by the vehicle movement processing method according to an embodiment of the present disclosure. The maps of vehicle distribution shown in FIG. 6 to FIG. 8 are all taking performing an adjustment on the basis of the map of vehicle distribution shown in FIG. 3 as examples. If vehicle B in front of the present vehicle (i.e., vehicle A) in the map of vehicle distribution shown in FIG. 3 decelerates or brakes, the current vehicle movement state of vehicle B may be illustrated in the map of vehicle distribution, and vehicle B currently decelerating or braking is illustrated by gray filling in FIG. 6. If the actual distance between the present vehicle (i.e., the vehicle A) and the preceding vehicle B in the map of vehicle distribution shown in FIG. 3 is smaller than the safe braking distance, the driver may be prompted by an icon in the map of vehicle distribution, and vehicle B is illustrated by black filling in FIG. 7, indicating that the safe braking distance between the present vehicle (i.e., the vehicle A) and its preceding vehicle B is insufficient, or the driver may be prompted by sending out an alarm voice (i.e., a safety prompt message) that the safe braking distance is insufficient. That is, the vehicle movement processing method provided by the embodiment of the present disclosure may prompt, through the acquired safe braking distance, and through various modes such as an icon in the map of vehicle distribution and/or voice broadcast when the distance between vehicles is close to or smaller than the safe braking distance, the driver that a relevant measure is to be taken and vehicle movement safety is to be noted. When the vehicle movement modes of vehicles A to F in the map of vehicle distribution shown in FIG. 3 all changes, then may all be displayed in the map of vehicle distribution. In FIG. 8, a curved arrow indicates that vehicle B in front of the present vehicle (i.e., the vehicle A) is currently changing a lane to a left lane.

Figure 9:
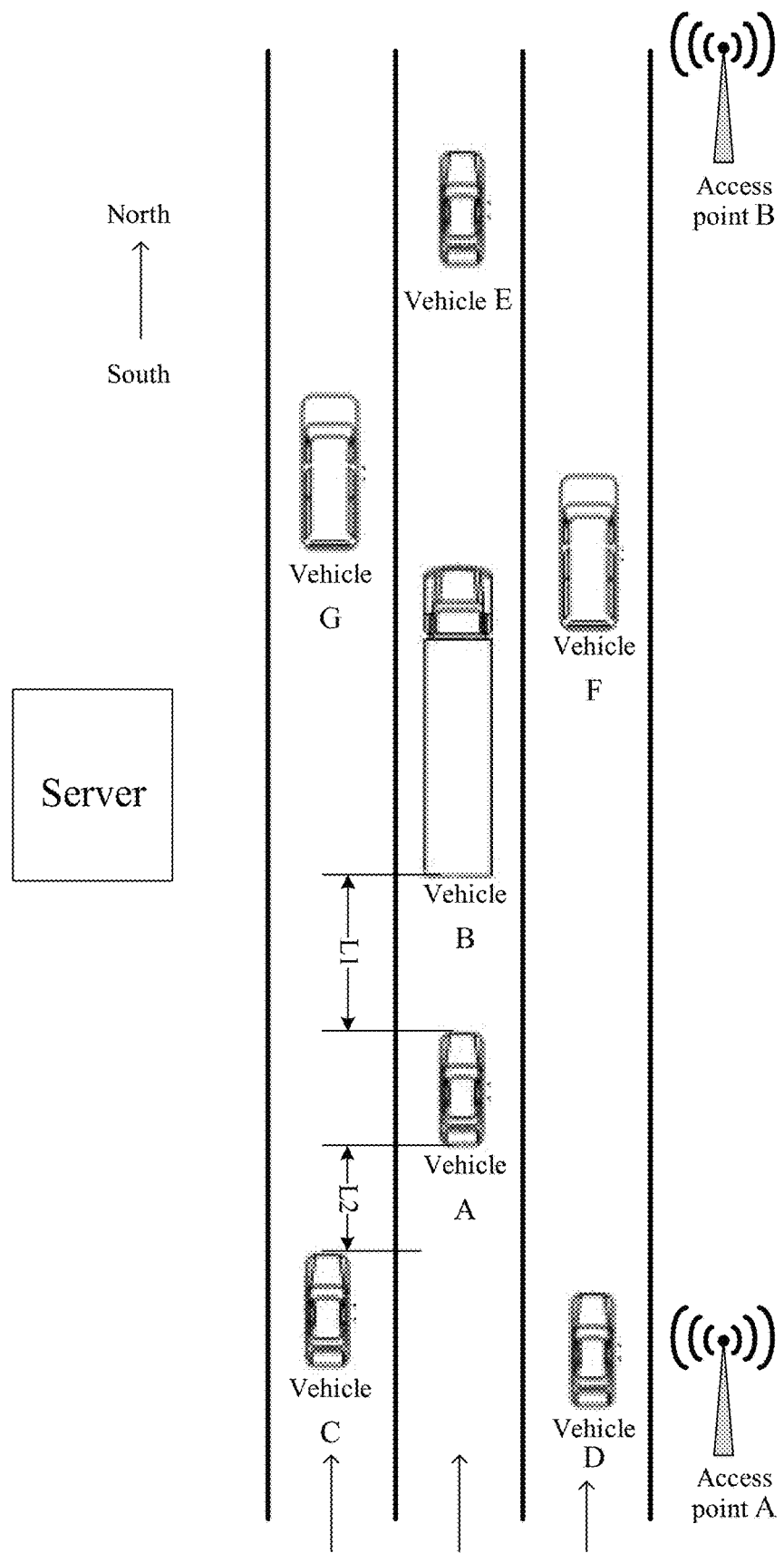
FIG. 9 is a schematic diagram of a system framework for vehicle movement processing according to an embodiment of the present disclosure.

The device for interactively performing the vehicle movement processing method with vehicles in the embodiment of the present disclosure may include the above-mentioned server. Since the service range of the server is relatively large, the stability of communication between vehicles in a periphery region served by the server and the server being relatively poor, multiple access points may be configured within the service range of the server to establish communication connections with vehicles in relevant road sections through these access points, so as to forward information between the vehicles and the server. FIG. 9 is a schematic diagram of another system framework in a vehicle movement processing according to an embodiment of the present disclosure. On the basis of the system framework shown in FIG. 2, an access point A and an access point B are disposed in FIG. 9, which may not only reduce communication load of the server, but is also beneficial to providing stable communication services to vehicles in the relevant sections of the access points. In addition, the communication facilities in the embodiments of the present disclosure may be, for example, the 4th Generation Mobile Communication Technology (4G) network or a 5G network. In addition to the communication connection between the vehicle and the server, as well as between the vehicle and the access point, the vehicle movement information of the vehicle may also be exchanged through Vehicle to Vehicle (V2V) between the adjacent vehicles. The above-mentioned diversified mode of communication is beneficial to improving global data processing accuracy.

Figure 10:
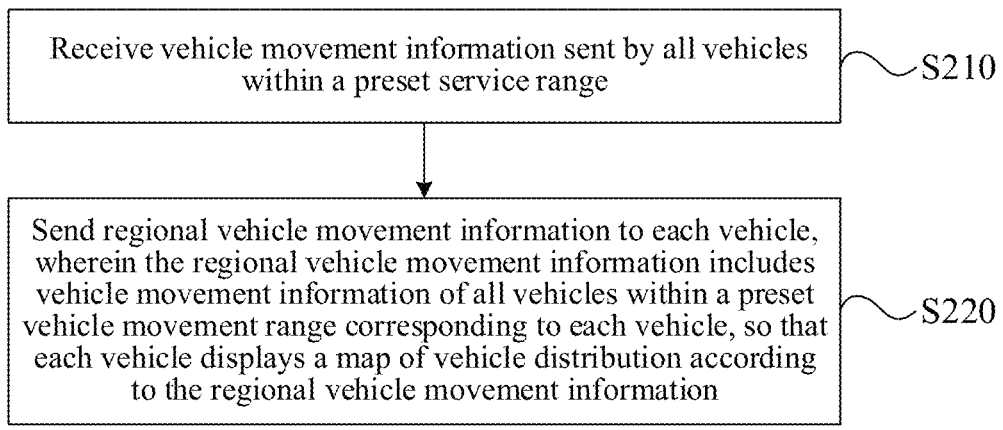
FIG. 10 is a flowchart of another vehicle movement processing method according to an embodiment of the present disclosure.

FIG. 10 is a flowchart of another vehicle movement processing method according to an embodiment of the present disclosure. The vehicle movement processing method provided in the present embodiment may be applied to a case where real-time states of the vehicles during vehicle movement is learnt by an information interaction between the server and the vehicles within the service range of the server. The vehicle movement processing method may be performed by the server, wherein the server may perform vehicle movement safety processing through communication with the vehicles within a preset service range and the access points. As shown in FIG. 10, the vehicle movement processing method provided in the present exemplary embodiment may include acts S210 and S220.

In S210, vehicle movement information sent by all vehicles within the preset service range is received.

In S220, regional vehicle movement information is sent to each vehicle, wherein the regional vehicle movement information includes vehicle movement information of all vehicles within a preset vehicle movement range corresponding to each vehicle, so that each vehicle displays a map of vehicle distribution according to the regional vehicle movement information.

Taking a target vehicle as an example, in act S220, regional vehicle movement information is sent to the target vehicle, wherein the regional vehicle movement information includes vehicle movement information of all vehicles within a preset vehicle movement range of the target vehicle, and the regional vehicle movement information is used for the target vehicle to display a map of vehicle distribution.

In an exemplary embodiment, the vehicle movement processing method may be used as an optional service, that is, the server may only send regional vehicle movement information to a target vehicle that needs the service. The target vehicle may be all of the vehicles, or may be part of the vehicles.

The vehicle movement processing method according to the exemplary embodiment is processing of a server for performing vehicle movement safety processing. The server in the present exemplary embodiment is used for providing all vehicles within the preset service range with regional vehicle movement information for performing vehicle movement safety processing. The server may broadcast and send the regional vehicle movement information to all vehicles within the preset service range (for example, when the regional vehicle movement information sent to the vehicles is same). Or, the server may send the regional vehicle movement information to access points of corresponding road sections, and these access points send the regional vehicle movement information to all vehicles within their access ranges. Or, different regional vehicle movement information may be sent to different vehicles in a unicast mode respectively. Or the regional vehicle movement information is sent in another mode. In the foregoing embodiments, it has been explained that each vehicle within the preset service range of the server may use the vehicle movement processing method provided in the embodiments shown in FIGS. 1 to 9 to perform vehicle movement safety processing. These vehicles may know the vehicle movement information of the present vehicles, which may include, for example, inherent information of the present vehicles and current information of vehicle movement mode, wherein the inherent information of the present vehicle includes, for example, one or more of: an identification code of the present vehicle, a license plate number, or a fixed identification feature of the vehicle after production or after a driving license is handled. Current information of vehicle movement mode may include, for example, one or more of: lane information, speed information, steering information (e.g., a steering orientation), acceleration, or braking of vehicle movement. The above-mentioned vehicle movement mode information may be detected in real time by the vehicle driving computer and the above-mentioned vehicle movement information of the present vehicle may also include positioning information of the present vehicle (for example, a GPS position).

In the present embodiment of the present disclosure, after the server receives the vehicle movement information of all vehicles within its service range, it may send the vehicle movement information received by the present server to these vehicles, or, data processing and a comprehensive analysis are performed on moving vehicles received by the present server and the vehicle movement information after the data processing and the comprehensive analysis is sent to these vehicles, so that the vehicles receive the regional traffic information sent by the server. Since the regional vehicle movement information sent by the server includes vehicle movement information of all vehicles within a preset vehicle movement range corresponding to each vehicle, each vehicle receiving the regional vehicle movement information may display a map of vehicle distribution according to its received regional vehicle movement information. A map of vehicle distribution displayed by the vehicle A may include, for example, positional relationships of all vehicles within the preset vehicle movement range corresponding to the vehicle A, and additionally may also include lanes and/or state information of the vehicles. The implementation of displaying, by the vehicle, the map of vehicle distribution according to the regional vehicle movement information has been described in detail in the above embodiment where a vehicle is an execution subject. It may be referred to the system framework shown in FIG. 2, the map of vehicle distribution shown in FIG. 3, and the embodiment shown in FIG. 4, and thus will not be repeated here.

The regional vehicle movement information in the embodiment of the present disclosure includes vehicle movement information corresponding to all vehicles within a preset vehicle movement range corresponding to a vehicle. In an exemplary implementation, a preset vehicle movement range corresponding to each vehicle (or multiple target vehicles) may be same, and the preset vehicle movement range may be a preset service range of a server, that is, the server sends same regional vehicle movement information to all vehicles within the preset service range. In another exemplary implementation, a preset vehicle movement range corresponding to a certain vehicle may be a certain range centered on the vehicle and radiating to the surroundings. Therefore, according to this implementation, preset vehicle movement ranges corresponding to at least two of the vehicles are different. For example, the regional vehicle movement information sent to the vehicle A by the server is vehicle movement information of all vehicles within 200 m in front of and behind the vehicle A. In this implementation, the server may perform data processing on all the vehicle movement information received thereby, and determine to send regional vehicle movement information within the preset vehicle movement range where the vehicle belongs to each vehicle according to a GPS position and a current road condition of each vehicle, that is, contents of regional vehicle movement information sent by the server to vehicles at different positions may be different.

According to the vehicle movement processing method provided by the embodiment of the present disclosure, the server receives vehicle movement information sent by all vehicles within the preset service range and sends regional vehicle movement information to each vehicle based on its received vehicle movement information, wherein the regional vehicle movement information includes vehicle movement information of all vehicles within the preset vehicle movement range corresponding to each vehicle, so that the vehicle may display a map of vehicle distribution according to the received regional vehicle movement information. A map of vehicle distribution displayed by a certain vehicle may include positional relationships of all vehicles within the preset vehicle movement range corresponding to the vehicle, and additionally may also include lanes and/or state information of the vehicles. According to the vehicle movement processing method provided by the embodiment of the present disclosure, the driver of the vehicle which performs an information interaction with the server may learn positional relationships and vehicle movement states of vehicles within a relatively large vehicle movement range according to the map of vehicle distribution displayed in the vehicle, being beneficial to making a faster response by the driver during vehicle movement, which may improve safety of driving the vehicle by the driver to a great extent. In addition, the vehicle movement processing method according to the embodiment of the present disclosure may be achieved on a current existing hardware configuration of the vehicle, avoiding a problem of high cost brought by a large-scale installation of hardware configuration.

Optionally, in an exemplary embodiment, the vehicle movement information of all vehicles received by the server may include not only following contents as shown in the above embodiments: the identification code of the vehicle, the license plate number, the GPS position, the driving lane, the speed, the steering orientation, the acceleration and the braking, but also a distance between a certain vehicle and adjacent vehicles (for example, adjacent vehicles in the front, the rear, the left and the right). For example, when a vehicle has an omni-directional ultrasonic radar, a distance between the vehicle and adjacent vehicles in the front, the rear, the left, and the right may be detected, or when the present vehicle has a radar in the front and the rear, a distance between the present vehicle and the adjacent vehicles in the front and the rear may be detected.

Figure 11:
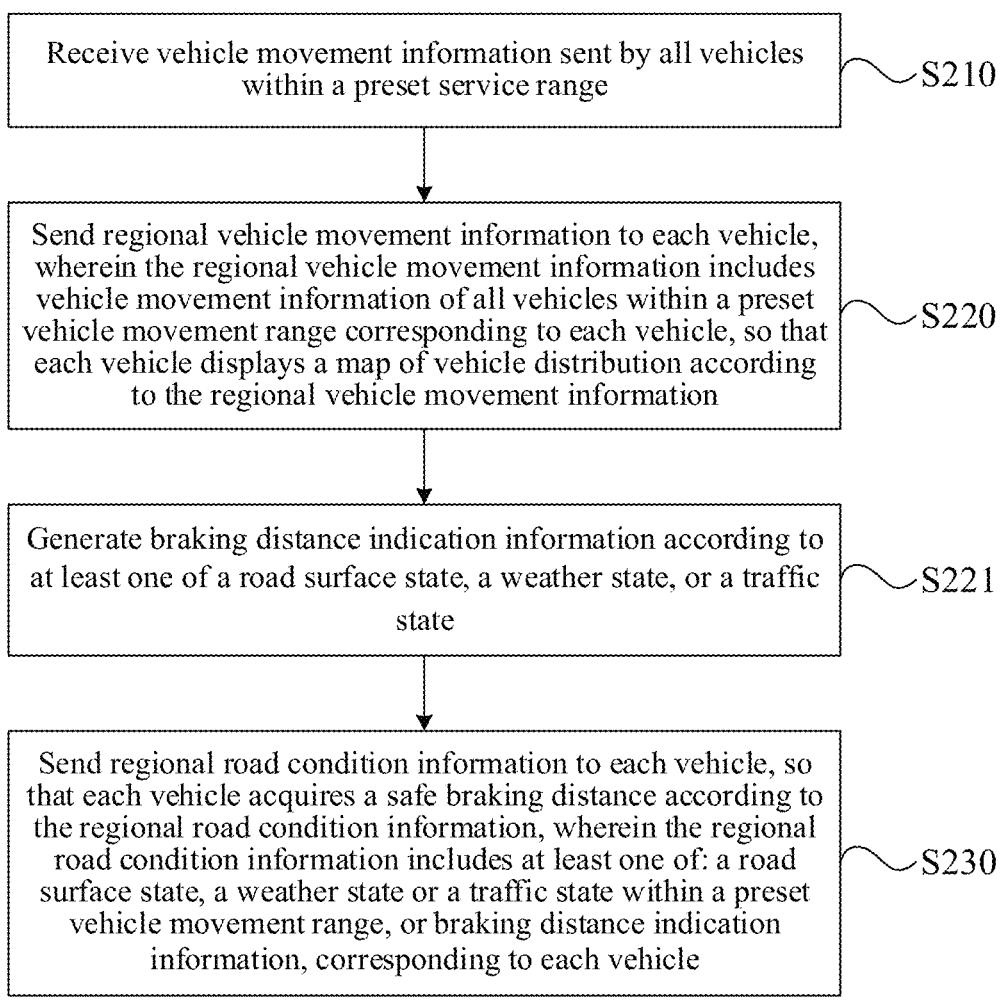
FIG. 11 is a flowchart of another vehicle movement processing method according to an embodiment of the present disclosure.

Optionally, FIG. 11 is a flowchart of another vehicle movement processing method according to an exemplary embodiment of the present disclosure. On the basis of the embodiment shown in FIG. 10, the vehicle movement processing method according to the exemplary embodiment may further include a following S230.

In S230, regional road condition information is sent to each vehicle, so that each vehicle acquires a safe braking distance according to the regional road condition information, wherein the regional road condition information includes at least one of: a road surface state, a weather state or a traffic state within a preset vehicle movement range, or braking distance indication information, corresponding to each vehicle.

The above description takes sending the regional road condition information to each vehicle as an example. In another embodiment, the regional road condition information may only be sent to a target vehicle for the target vehicle to acquire a safe braking distance.

In an exemplary embodiment, the server may send not only regional vehicle movement information but also regional road condition information to vehicles within the preset service range. For example, the server may query a road surface database (e.g., including a road surface type and/or a slope of a current road section, etc.), a real-time weather state (such as a sunny day, a cloudy day, or a rainy and snowy weather, etc.) and a real-time traffic state (such as a traffic jam, or an accidents, etc.), and send these pieces of information to vehicles within the preset server range.

Optionally, the regional road condition information sent by the server includes braking distance indication information. In an exemplary embodiment, prior to S230, it may further include S221.

In S221, the braking distance indication information is generated according to at least one of a road surface state, a weather state, or a traffic state.

The braking distance indication information according to the present exemplary embodiment, for example, may be a functional relation or a curve graph between suggested safe braking distances and vehicle movement speeds, or a keyword querying a relationship table between a safe braking distance and a vehicle movement speed, etc. The braking distance indication information may be used for performing, by a vehicle, an early warning of the safe braking distance to a driver during vehicle movement.

In the vehicle movement processing method provided by the embodiment of the present disclosure, a vehicle may get a safe braking distance for measuring relative safety between the present vehicle and vehicles on the periphery in various modes, and send out a safety prompt message for prompting a driver based on the safe braking distance. In the embodiment of the present disclosure, the mode in which the vehicle acquires the safe braking distance, the mode in which the safety prompt message is sent according to the safe braking distance, and the mode in which the display content of the map of vehicle distribution is adjusted according to the change of the vehicle movement mode have been described in detail in the foregoing embodiments, and thus will not be repeated here.

Optionally, in an exemplary embodiment, the implementation in which the server receives the vehicle movement information sent by all vehicles within the preset service range may include one or more of following modes: a first mode, in which the vehicle movement information sent by the vehicle according to a preset time interval is received; and, a second mode, in which vehicle movement information sent by the vehicle when the vehicle movement mode of the vehicle itself changes and according the changed vehicle movement mode is received, wherein the change of the vehicle movement mode includes at least one of: acceleration, deceleration, braking, lane changing, or overtaking.

Several implementations of sending the vehicle movement information by the vehicle have been described in detail in the foregoing embodiments, and thus will not be repeated here.

In an exemplary implementation of the embodiment of the present disclosure, the regional vehicle movement information sent by the server may include vehicle movement information sent by all vehicles within the service range of the server received by the server. In this implementation, the server directly broadcasts its received vehicle movement information to vehicles within the preset service range, or, when sending regional vehicle movement information, the server sends, according to a GPS position of each vehicle, vehicle movement information of vehicles within a preset vehicle movement range corresponding to the vehicle to different vehicles. When the preset vehicle movement range of the vehicle crosses service ranges of two servers, for example, a certain vehicle is about to leave a service range of a first server and enter a service range of a second server, the first server may calculate a range of the preset vehicle movement range of the vehicle exceeding a present service region (hereinafter referred to as "an exceeded range"), acquire vehicle movement information of all vehicles within the exceeded range from the second server, and send the acquired vehicle movement information of all vehicles within the preset vehicle movement range of the vehicle to the vehicle. For another example, if a certain vehicle has just entered the service range of the second server, while part of its preset vehicle movement range is still within the service range of the first server, then the second server may calculate an exceeded range of the vehicle according to the preset vehicle movement range of the vehicle, acquire vehicle movement information of all vehicles within the exceeded range from the first server, and send the acquired vehicle movement information of all vehicles within the preset vehicle movement range of the vehicle to the vehicle. In another exemplary embodiment, the first server and the second server may periodically interact with vehicle movement information of vehicles within a preset boundary range to improve speed of acquiring and sending the vehicle movement information.

In another exemplary implementation of the embodiment of the present disclosure, the server may perform, according to the received vehicle movement information of all vehicles within the preset service range, data processing and a comprehensive analysis on these pieces of vehicle movement information, and generate regional vehicle movement information for sending to each vehicle. In this implementation, the regional vehicle movement information includes not only a GPS position of each vehicle, but also a distance between adjacent vehicles, which may thus reduce calculation time of a vehicle in a process of generating a map of vehicle distribution, improving processing speed of the vehicle itself.

Based on the vehicle movement processing method provided in any one of the embodiments shown in FIGS. 1 to 8, an embodiment of the present disclosure further provides a vehicle, which is a hardware structure for executing the vehicle movement processing method provided in any of the embodiments shown in FIGS. 1 to 8, and similarly, it may be a vehicle in the system framework shown in FIG. 2 or FIG. 9.

Figure 12:
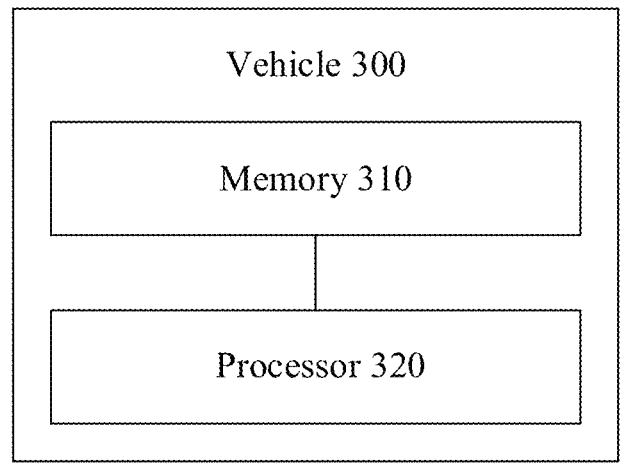
FIG. 12 is a schematic diagram of a structure of a vehicle according to an embodiment of the present disclosure.

FIG. 12 shows a schematic diagram of a structure of a vehicle according to an embodiment of the present disclosure. A vehicle 300 provided by an embodiment of the present disclosure may include a memory 310 and a processor 320; the memory 310 is configured to store executable instructions, and the processor 320 is configured to implement the vehicle movement processing method in any one of the embodiments shown in FIGS. 1 to 8 when executing the executable instructions stored in the memory.

In the present embodiment of the present disclosure, the processor 320 is, for example, an ECU, which may provide a unique identification code of a present vehicle and a license plate code, and may detect the vehicle movement mode of the vehicle in real time, for example, states of the vehicle such as deceleration, acceleration, braking, steering and emergency double flash warning may all be detected by the ECU in real time. Operations executed by the processor 320 in the embodiment of the present disclosure have been described in detail in the above embodiment with the target vehicle as an execution subject, and thus are not repeated here.

In another exemplary embodiment, a schematic diagram of a structure of another vehicle is further provided. On the basis of the structure of the vehicle shown in FIG. 12, the vehicle in the present exemplary embodiment may further include: a GPS 330, a ranging radar 340, a camera 350 and a display 360.

The GPS 330 is configured to locate a position of a vehicle, i.e., acquire positioning information of the vehicle, wherein the positioning information may be acquired in real time or periodically; the position may be a GPS position; it is used for providing a position of the present vehicle, and subsequently for generating a map of vehicle distribution by vehicles within a preset range based on a GPS position of each vehicle. In another embodiment, the GPS may also be a positioning module using another positioning system.

The ranging radar 340 is configured to detect a distance between the vehicle and an adjacent vehicle in real time.

The camera 350 is configured to monitor a quantity of lanes during movement of the vehicle and detect the lane on which the vehicle moves, wherein the quantity of lanes and the lane on which the vehicle moves may be detected periodically or monitored in real time.

The display 360 is configured to display a map of vehicle distribution, wherein the map of vehicle distribution shows the position of the present vehicle.

Optionally, the display 360 is also configured to display a safety prompt message for instructing a driver sent out by the processor.

Based on the vehicle movement processing method provided in any one of the embodiments shown in FIGS. 9 to 10, an embodiment of the present disclosure further provides a service, which may be a hardware structure for executing the vehicle movement processing method provided in any one of the embodiments shown in FIGS. 9 to 10, and similarly it may be a server in the system framework shown in FIG. 2 or FIG. 9.

Figure 14:
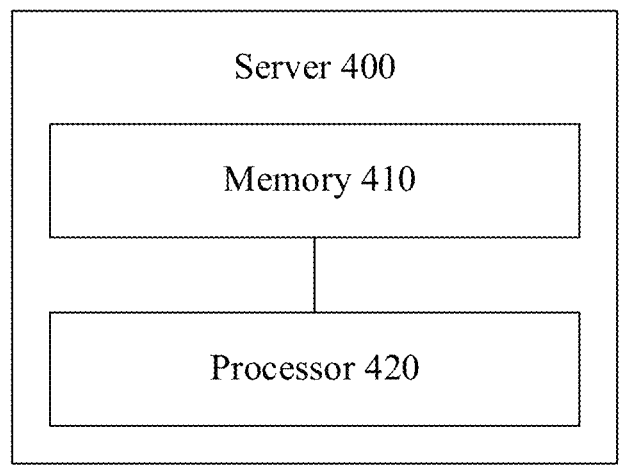
FIG. 14 is a schematic diagram of a structure of a server according to an embodiment of the present disclosure.

As shown in FIG. 14, a server 400 provided by the embodiment of the present disclosure may include a memory 410 and a processor 420; the memory 410 is configured to store executable instructions; and the processor 420 is configured to implement the vehicle movement processing method in any one of the embodiments shown in FIGS. 9 to 10 when executing the executable instructions stored in the memory.

Operations performed by the processor 420 in the embodiment of the present disclosure have been described in detail in the aforementioned embodiment with the server as an execution subject, and thus are not repeated here.

Figure 13:
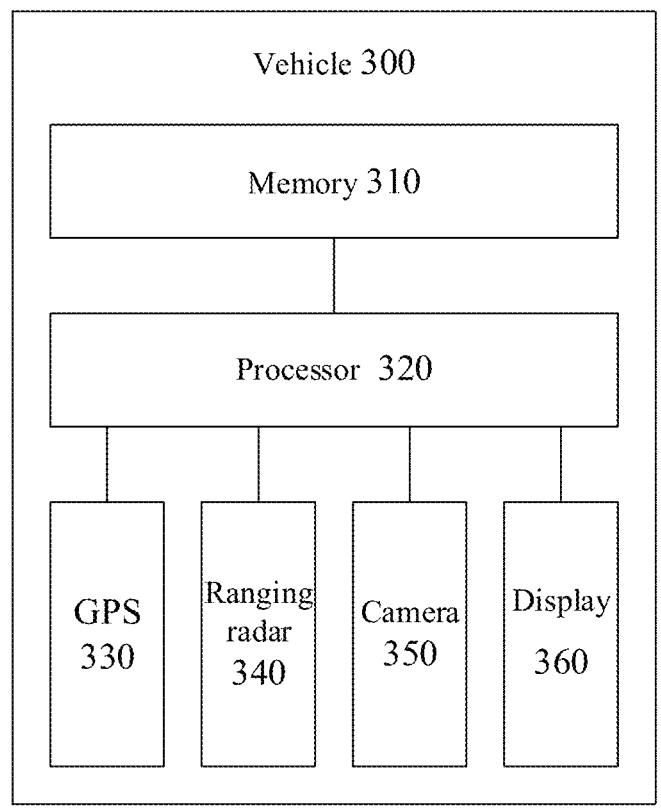
FIG. 13 is a schematic diagram of another structure of a vehicle according to an embodiment of the present disclosure.
Figure 15:
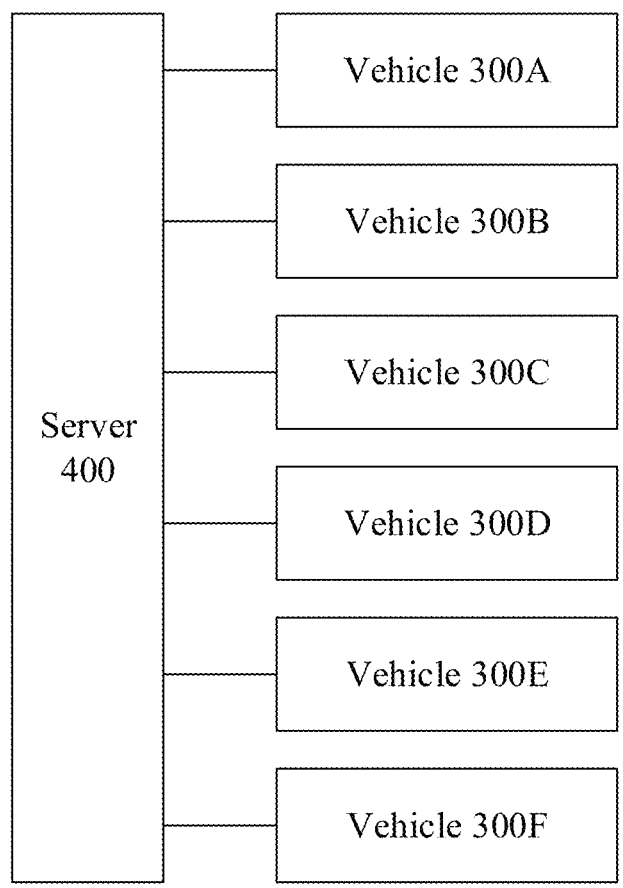
FIG. 15 is a schematic diagram of a structure of a vehicle movement system according to an embodiment of the present disclosure.

In an exemplary embodiment, as shown in FIG. 15, an embodiment of the present disclosure further provides a vehicle movement system. The vehicle movement system provided by the embodiment of the present disclosure may include a server 400 as described in any one of the embodiment shown in FIG. 14, and at least one vehicle 300 as described in any one of the embodiments shown in FIGS. 12 and 13 located within a service range of the server 400.

The vehicle movement system shown in FIG. 15 illustrates vehicles 300A to 300F located within the service range of the server 400. The vehicle movement safety processing mode performed by vehicles (300A to 300F) and the server 400 in the present exemplary embodiment has been described in detail in the foregoing embodiments, and thus will not be repeated here.

Figure 16:
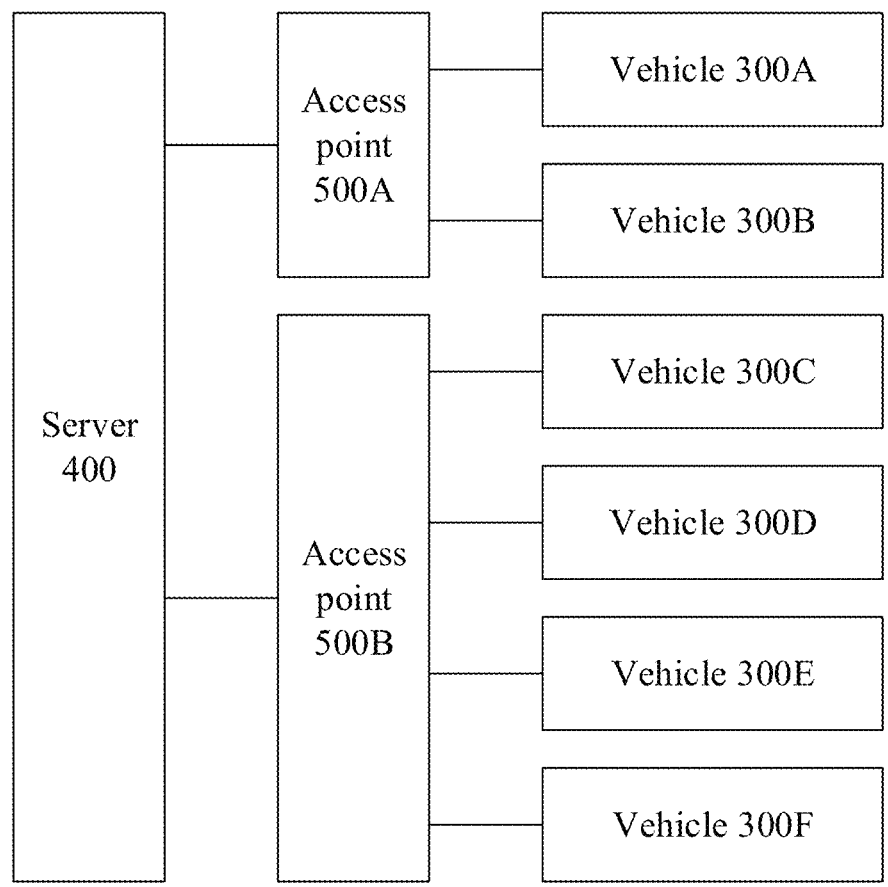
FIG. 16 is a schematic diagram of a structure of another vehicle movement system according to an embodiment of the present disclosure.
Figure 17:
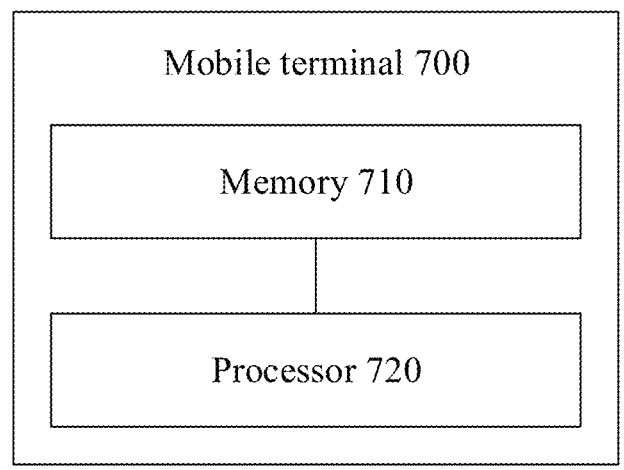
FIG. 17 is a schematic diagram of a structure of a mobile terminal according to an embodiment of the present disclosure.

Optionally, FIG. 16 is a schematic diagram of a structure of another vehicle movement system according to an embodiment of the present disclosure. On the basis of the structure of the vehicle movement system shown in FIG. 15, the vehicle movement system according to the present exemplary embodiment may further include: at least one access point 500 located within the service range of the server 400, configured to establish a communication connection with vehicle 300 within a coverage range of the access point 500, and forward vehicle movement information received from vehicle 300 to the server 400, as well as regional vehicle movement information and regional road condition information received from the server 500 to vehicle 300.

The vehicle movement system shown in FIG. 16 is illustrated by taking two access points 500A and 500B as an example. In the present example, vehicles 300A and 300B establish a communication connection with access point 500A, and vehicles 300C to 300F establish a communication connection with access point 500B. In another embodiment, there may be more access points within the service range of the server 400, or there may be more moving vehicles and an access point with which a vehicle establishes a communication connection changes due to the change of the position of the vehicle during vehicle movement. In another embodiment, adjacent vehicles in the vehicle movement system shown in the embodiment of the present disclosure may establish a communication connection through V2V communication to realize a data information interaction. The vehicle movement safety processing mode performed by the server and the vehicle in the vehicle movement system provided by the present exemplary embodiment is the same as that in the embodiments shown in FIG. 12 to FIG. 14 above, and similarly performs the vehicle movement processing method provided by any one shown in FIG. 1 to FIG. 11 of the embodiments of the present disclosure, which will not be repeated here.

Figure 18:
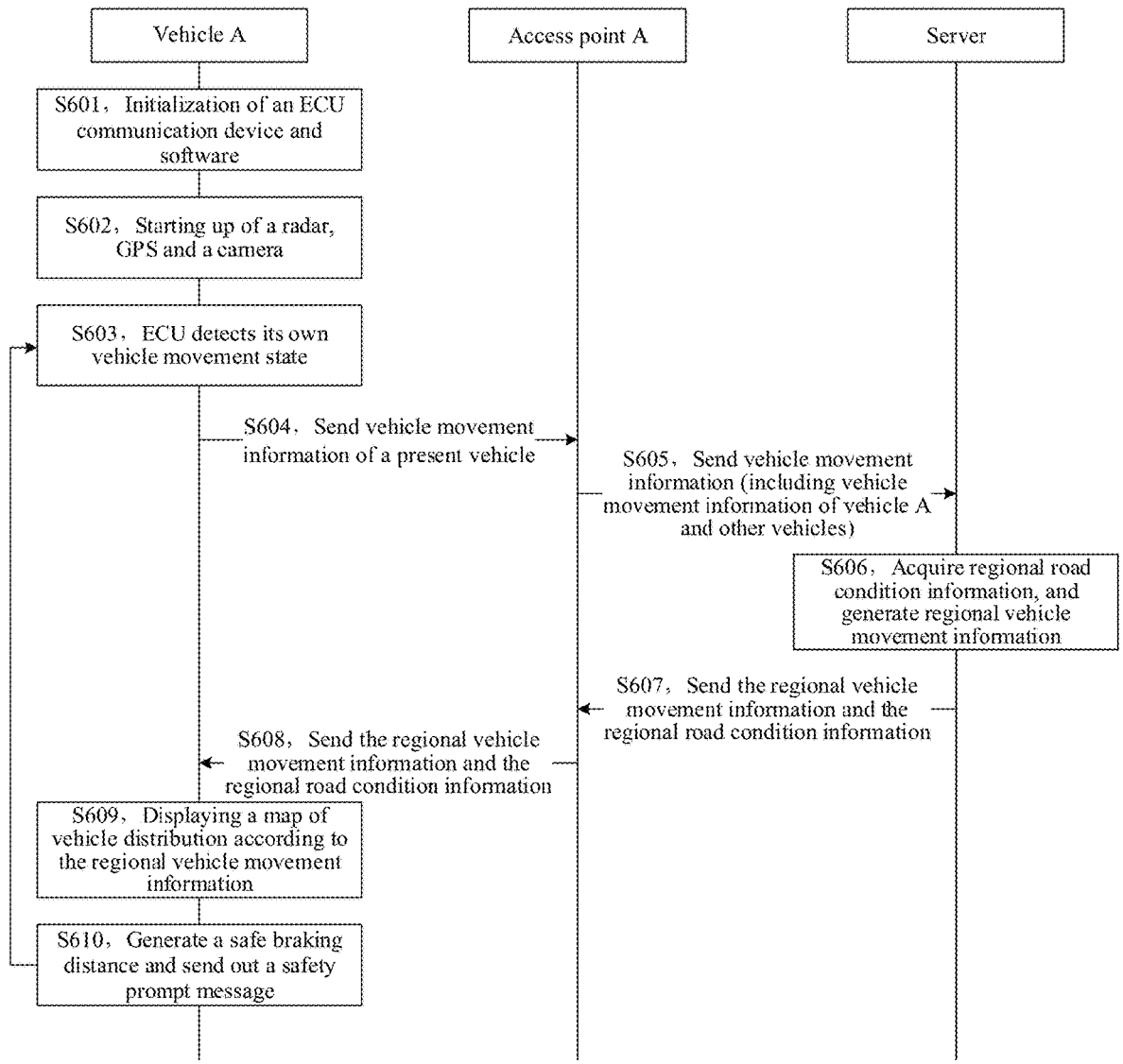
FIG. 18 is an interactive flowchart of a vehicle movement processing method according to an embodiment of the present disclosure.

In an exemplary embodiment, FIG. 18 shows a schematic diagram of a structure of a mobile terminal according to an embodiment of the present disclosure. A mobile terminal 700 provided by the embodiment of the present disclosure may include a memory 710 and a processor 720; the memory 710 is configured to store executable instructions; and the processor 720 is configured to implement the vehicle movement processing method in any one of the aforementioned embodiments when executing the executable instructions stored in the memory.

In following, an application of the vehicle movement processing method provided by the embodiment of the present disclosure is explained through an interaction among three sides of a vehicle, a server and an access point. FIG. 18 shows an interactive flowchart of a vehicle movement processing method according to an exemplary embodiment of the present disclosure. The vehicle movement processing method provided in the embodiment shown in FIG. 18 is performed by vehicles, a server and an access point. With reference to the system framework shown in FIG. 9, each vehicle in FIG. 9 may perform the vehicle movement processing method in the present exemplary embodiment through an information interaction with the server. The flow shown in FIG. 18 is illustrated by taking the vehicle A as a present vehicle, and the vehicle movement processing method may include acts S601 to S610.

In S601, an ECU communication device and software of the vehicle A are initialized.

In S602, a radar, GPS and a camera of the vehicle A are started up.

In S603, ECU of the vehicle A detects its own vehicle movement state, for example, acquires a GPS position through the GPS, acquires a lane of the vehicle A through the camera, or detects a speed of the vehicle A, whether being steering, whether being accelerating and whether being braking through the ECU, etc.

In S604, the vehicle A sends vehicle movement information of the present vehicle, wherein the vehicle movement information may include one or more of following information: an identification code of the present vehicle, a license plate number, a GPS position, a driving lane, a speed, a steering orientation, acceleration, or braking, etc.

The flow shown in FIG. 18 takes the system framework shown in FIG. 9 as an example for explaining the mode of performing the vehicle movement processing, that is, access point A, which establishes a communication connection with the vehicle A, receives the vehicle movement information sent by the vehicle A.

In S605, the access point A forwards its received vehicle movement information to the server, wherein the vehicle movement information includes vehicle movement information of the vehicle A and vehicle movement information of another vehicle served by the access point A.

The server in the present exemplary embodiment receives vehicle movement information of vehicles forwarded to the server by all access points within a service range of the server;

In S606, the server acquires regional road condition information and generates regional vehicle movement information sent to each vehicle (a target vehicle), wherein the regional road condition information includes at least one of: a road surface state, a weather state or a traffic state within a preset vehicle movement range, or braking distance indication information, corresponding to each vehicle.

In S607, the server sends regional vehicle movement information and regional road condition information to access points (including access point A and another access point) connected to the server, wherein the regional vehicle movement information includes vehicle movement information of all vehicles within the preset vehicle movement range corresponding to the target vehicle.

In S608, the access point A sends regional vehicle movement information and regional road condition information to the vehicle A.

In S609, the vehicle A displays a map of vehicle distribution according to the received regional vehicle movement information.

In S610, the vehicle A generates a safe braking distance according to the received regional road condition information, and sends out a safety prompt message under a preset condition, wherein the preset condition may be under a case that an actual distance between the vehicle A and an adjacent vehicle is smaller than the safe braking distance, and then returns to perform S603.

In another embodiment, act S603 may be performed in real time, that is, detection is performed at any time, without having to be performed after act S610.

The vehicle movement system for performing vehicle movement safety processing according to the embodiment of the present disclosure may include multiple access points and multiple vehicles, and operations performed by these vehicles and access points are the same as those performed by the vehicle A and the access point A in the flow shown in FIG. 18, and thus are only illustrated by taking the modes in which the vehicle A and the access point A perform the vehicle movement processing method as an example.

Embodiments of the present disclosure further provide a computer readable storage medium, which stores executable instructions. The vehicle movement processing method provided in any one of the embodiments shown in FIG. 1 to FIG. 9 may be implemented when the executable instructions are executed by a processor, or, the vehicle movement processing method provided in any one of the embodiments shown in FIG. 10 to FIG. 11 may be implemented when the executable instructions are executed by a processor. The implementation of the computer readable storage medium provided by the embodiment of the present disclosure is basically identical to the vehicle movement processing method provided by the above embodiments, and will not be repeated here.

Those of ordinary skill in the art may understand that all or some of the acts in the method, the system, and functional modules/units in the device disclosed above may be implemented as software, firmware, hardware, and an appropriate combination thereof. In a hardware implementation, the division between functional modules/units mentioned in the above description does not necessarily correspond to the division of physical components. For example, a physical component may have multiple functions, or a function or an act may be performed by several physical components in cooperation. Some or all of the components may be implemented as software executed by a processor, such as a digital signal processor or a microprocessor, or as hardware, or as an integrated circuit, such as an application specific integrated circuit. Such software may be distributed on a computer readable medium, which may include a computer storage medium (or a non-transitory medium) and a communication medium (or a transitory medium). As is well known to those of ordinary skill in the art, the term "computer storage medium" includes volatile and nonvolatile, removable and non-removable media implemented in any method or technology for storing information (such as computer readable instructions, a data structure, a program module or other data). The computer storage medium includes, but is not limited to, RAM, ROM, EEPROM, a flash memory or another memory technology, CD-ROM, a digital versatile disk (DVD) or another optical disk storage, a magnetic cassette, a magnetic tape, a magnetic disk storage or another magnetic storage device, or any other medium that may be used for storing desired information and may be accessed by a computer. Furthermore, it is well known to those of ordinary skill in the art that the communication medium typically contains computer readable instructions, a data structure, a program module, or other data in a modulated data signal such as a carrier or another transmission mechanism, or the like, and may include any information delivery medium.

Although implementations disclosed in the present invention are as the above, the described contents are only implementations used for facilitating understanding the present invention, and are not used for limiting the present invention. Any person skilled in the art to which the present invention pertains may make any modifications and variations in the form and details of implementation without departing from the spirit and the scope disclosed in the present invention. Nevertheless, the scope of patent protection of the present invention shall still be subject to the scope defined by the appended claims.

What is claimed is:

1. A vehicle movement processing method, comprising:
    sending, by a vehicle within a preset vehicle movement range, vehicle movement information of the vehicle to a sever, wherein the vehicle movement information of the vehicle sent to the server comprises at least one of an identification code of vehicle or a license plate number and also comprises speed information of the vehicle;
    receiving, by the vehicle or a mobile terminal, regional vehicle movement information from the server, wherein the regional vehicle movement information comprises vehicle movement information of all vehicles within the preset vehicle movement range, and the regional vehicle movement information received from the server comprises a positional relationship of the all vehicles within the preset vehicle movement range generated by the server; and
    generating and displaying, by the vehicle or the mobile terminal, a map of vehicle distribution according to the regional vehicle movement information, wherein the map of vehicle distribution is used for graphically displaying the positional relationship of the all vehicles within the preset vehicle movement range and is used for a driver of the vehicle to control driving of the vehicle according to the map of vehicle distribution.

2. The vehicle movement processing method according to claim 1, wherein the regional vehicle movement information comprises inherent information and information of vehicle movement mode, wherein, the inherent information comprises the at least one of the identification code of vehicle or the license plate number, and the information of vehicle movement mode comprises positioning information.

3. The vehicle movement processing method according to claim 2, wherein the vehicle movement information further comprises one or more of: lane information, steering information, speed change information, or braking information of vehicle movement.

4. The vehicle movement processing method according to claim 2, wherein, generating and displaying, by the vehicle or the mobile terminal, the map of vehicle distribution according to the regional vehicle movement information comprises:
    generating and displaying, by the vehicle or the mobile terminal, the map of vehicle distribution, in which the vehicle is identified, according to the regional vehicle movement information, wherein positions of the all vehicles in the map of vehicle distribution are determined according to the positioning information in the regional vehicle movement information.

5. The vehicle movement processing method according to claim 4, further comprising:
    monitoring, by the vehicle or the mobile terminal, a distance between the vehicle and an adjacent vehicle in real time, and performing, by the vehicle or the mobile terminal, a position adjustment in the map of vehicle distribution.

6. The vehicle movement processing method according to claim 4, further comprising:
    acquiring or calculating, by the vehicle or the mobile terminal, a safe braking distance, and determining, by the vehicle or the mobile terminal, whether to send out a safety prompt message according to the safe braking distance, the position of the vehicle in the map of vehicle distribution, and a distance between the vehicle and an adjacent vehicle.

7. The vehicle movement processing method according to claim 1, wherein:
    the map of vehicle distribution further comprises lanes and/or state information of the all vehicles.

8. The vehicle movement processing method according to claim 1, wherein, sending the vehicle movement information of the vehicle to the server comprises at least one of:
    sending the vehicle movement information of the vehicle to the server according to a preset time interval; or,
    when a vehicle movement mode of the vehicle changes, sending the vehicle movement information of the vehicle to the server according to the changed vehicle movement mode, wherein the change of the vehicle movement mode comprises at least one of: acceleration, deceleration, braking, lane changing, or overtaking.

9. The vehicle movement processing method according to claim 1, further comprising:
    receiving, by the vehicle or the mobile terminal, regional road condition information, wherein the regional road condition information comprises at least one of: a road surface state, a weather state or a traffic state within the preset vehicle movement range, or braking distance indication information.

10. The vehicle movement processing method according to claim 1, wherein, the map of vehicle distribution is a vector map.

11. A vehicle, comprising a memory and a processor, wherein:
    the memory is configured to store executable instructions; and
    the processor is configured to implement the vehicle movement processing method according to claim 1 when executing the executable instructions stored in the memory.

12. A mobile terminal, comprising a memory and a processor, wherein:
    the memory is configured to store executable instructions; and
    the processor is configured to implement the vehicle movement processing method according to claim 1 when executing the executable instructions stored in the memory.

13. A non-transitory computer readable storage medium, in which executable instructions are stored, and the vehicle movement processing method according to claim 1 is implemented when the executable instructions are executed by a processor.

14. A vehicle movement processing method, comprising:
    receiving, by a server, vehicle movement information sent by all vehicles within a preset service range, wherein the vehicle movement information sent by a vehicle to the server comprises at least one of an identification code of vehicle or a license plate number and also comprises speed information of the vehicle; and
    sending, by the server, regional vehicle movement information to a target vehicle or a mobile terminal, wherein the regional vehicle movement information comprises vehicle movement information of all vehicles within a preset vehicle movement range corresponding to the target vehicle and comprises a positional relationship of the all vehicles within the preset vehicle movement range generated by the server, and the regional vehicle movement information is used for the target vehicle or the mobile terminal to generate and display a map of vehicle distribution; wherein, the map of vehicle distribution displayed by the target vehicle or the mobile terminal comprises the positional relationship of the all vehicles within the preset vehicle movement range and is used for a driver of the target vehicle to control driving of the target vehicle according to the map of vehicle distribution.

15. The vehicle movement processing method according to claim 14, further comprising:

sending, by the server, regional road condition information to the target vehicle or the mobile terminal, wherein the regional road condition information is used for the target vehicle or the mobile terminal to acquire a safe braking distance, and the regional road condition information comprises at least one of: a road surface state, a weather state or a traffic state within the preset vehicle movement range, or braking distance indication information, corresponding to the target vehicle.

16. The vehicle movement processing method according to claim 15, wherein, before sending, by the sever, the regional road condition information, the method further comprises:

generating, by the server, the braking distance indication information according to at least one of the road surface state, the weather state, or the traffic state.

17. The vehicle movement processing method according to claim 14, wherein preset vehicle movement ranges corresponding to target vehicles are the same, and the preset vehicle movement ranges are the same as the preset service range; or, preset vehicle movement ranges corresponding to at least two target vehicles are different.

18. The vehicle according to claim 11, further comprising at least one of:

a global positioning system, configured to acquire positioning information of the vehicle;

a ranging radar, configured to detect a distance between the vehicle and an adjacent vehicle in real time;

a camera, configured to monitor a quantity of lanes during movement of the vehicle and detect a lane on which the vehicle moves; or a display, configured to display the map of vehicle distribution.

19. A server, comprising a memory and a processor, wherein:

the memory is configured to store executable instructions; and the processor is configured to implement the vehicle movement processing method according to claim 14 when executing the executable instructions stored in the memory.

* * * * *